(12) United States Patent
Senatore et al.

(10) Patent No.: US 10,320,851 B2
(45) Date of Patent: Jun. 11, 2019

(54) METHODS AND DEVICES FOR DETECTING AND CORRELATING DATA PACKET FLOWS IN A LAWFUL INTERCEPTION SYSTEM

(71) Applicant: Telefonaktiebolaget LM Ericsson (publ), Stockholm (SE)

(72) Inventors: Andrea Senatore, Pellezano (IT); Francesco Toro, Baronissi (IT); Elvira Villani, Salerno (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/752,726

(22) PCT Filed: Aug. 27, 2015

(86) PCT No.: PCT/EP2015/069689
§ 371 (c)(1),
(2) Date: Feb. 14, 2018

(87) PCT Pub. No.: WO2017/032425
PCT Pub. Date: Mar. 2, 2017

(65) Prior Publication Data
US 2018/0241782 A1 Aug. 23, 2018

(51) Int. Cl.
*H04L 12/16* (2006.01)
*H04L 29/06* (2006.01)
(Continued)

(52) U.S. Cl.
CPC ........ *H04L 63/306* (2013.01); *H04L 65/1006* (2013.01); *H04L 65/1016* (2013.01);
(Continued)

(58) Field of Classification Search
None
See application file for complete search history.

(56) References Cited

U.S. PATENT DOCUMENTS

2010/0083364 A1* 4/2010 Fernandez Gutierrez ..................
H04M 3/2281
726/13
2011/0141947 A1* 6/2011 Li .................. H04M 3/2281
370/259

(Continued)

FOREIGN PATENT DOCUMENTS

EP 2785004 A1 10/2014

OTHER PUBLICATIONS

3rd Generation Partnership Project, "Technical Specification Group Services and System Aspects; 3G security; Handover interface for Lawful Interception (LI) (Release 12", 3GPP TS 33.108 V12.7.0, Dec. 2014, pp. 1-249.

(Continued)

*Primary Examiner* — Sithu Ko
(74) *Attorney, Agent, or Firm* — Coats & Bennett, PLLC

(57) ABSTRACT

The following disclosure relates a method and mediation device (100) in a Lawful Interception (LI) system for detecting and correlating copies of SIP and RTP flows, from different domains EPS or IMS, said method comprising to determine a unique IMS Communication Identity Number, IMS CIN, and a corresponding correlation set of identifiers, storing each unique IMS CIN together with its correlation set for an intercepted communication session, correlating a SIP or RTP flow received from one domain to the same SIP or RTP flows of the same communication session received from the other domain by comparing the flow identity information of the received flow to the stored correlation sets for identifying a matching correlation set and its unique IMS CIN and sending to a LEA requesting for LI of the target said received SIP or RTP flow comprising said identified unique IMS CIN for a matching correlation set.

23 Claims, 14 Drawing Sheets

(51) Int. Cl.
*H04W 12/02* (2009.01)
*H04M 3/22* (2006.01)

(52) U.S. Cl.
CPC ........ *H04L 65/608* (2013.01); *H04M 3/2281* (2013.01); *H04W 12/02* (2013.01); *H04L 2463/121* (2013.01); *H04M 2207/185* (2013.01)

(56) References Cited

U.S. PATENT DOCUMENTS

| | | | | |
|---|---|---|---|---|
| 2011/0299462 | A1* | 12/2011 | Imbimbo | H04L 63/08 370/328 |
| 2012/0254403 | A1* | 10/2012 | Imbimbo | H04W 12/02 709/224 |
| 2013/0288652 | A1* | 10/2013 | Ciriaco | G10L 15/00 455/414.1 |
| 2016/0080423 | A1* | 3/2016 | Milinski | H04L 63/304 726/1 |
| 2018/0035284 | A1* | 2/2018 | Fujinami | H04W 48/18 |

OTHER PUBLICATIONS

3rd Generation Partnership Project, "Technical Specification Group Services and System Aspects; 3G security; Lawful interception architecture and functions (Release 12)", 3GPP TS 33.107 V12.9.0, Dec. 2014, pp. 1-224.

3rd Generation Partnership Project, "Technical Specification Group Services and System Aspects; 3G security; Lawful Interception requirements (Release 12)", 3GPP TS 33.106 V12.5.0, Dec. 2014, pp. 1-18.

3rd Generation Partnership Project, "Universal Mobile Telecommunications System (UTMS) LTE; 3G security; Lawful interception architecture and functions (3GPP TS 33.107 version 12.11.0 Release 12)", 3GPP TS 33.107 V12.11.0, Jul. 2015, pp. 1-237.

* cited by examiner

METHODS AND DEVICES FOR DETECTING AND CORRELATING DATA PACKET FLOWS IN A LAWFUL INTERCEPTION SYSTEM

TECHNICAL FIELD

The present disclosure relates to a method, a mediation device, computer program and computer program product in a Lawful Interception system. Said method enables detecting and correlating copies of Session Initiation Protocol, SIP, and Real-time Transport Protocol, RTP, flows, respectively, belonging to a communication session of an intercepted user, especially VoLTE calls, intercepted in different domains.

BACKGROUND

The evolution of telecommunication has leaded changes both in the access network and in the core/services network. Long Term Evolution (LTE) and IP Multimedia Subsystem (IMS) are respectively the main examples of this evolution.

LTE is the natural upgrade path for carriers with both GSM/UMTS (Groupe Speciale Mobile/Universal Mobile Telecommunications System) networks and CDMA2000 (Code Division Multiple Access) networks. IMS core network is the evolution of Mobile Softswitch Solution (MSS) core network where the telephony services are provided through AS (Application Server).

IMS network is able to provide telephony services regardless of access technology (e.g. 3G (third generation), LTE, WiFi) although when LTE access technology is used high quality of service can be guaranteed especially for real-time services. VoLTE (Voice over LTE) is the main example of real-time service. A VoLTE call can be seen as an IMS VoIP (Voice over IP) call using the LTE access network.

GSMA (Groupe Speciale Mobile Association) in Permanent Reference Document (PRD) IR.92 [IMS Profile for Voice and SMS Version 8.0, 18 Sep. 2013] defines specific profiles for control and media planes of voice service on LTE.

From a lawful interception point of view a network operator shall provide access to the intercepted Content of Communications (CC) and the Intercept Related Information (IRI) of the mobile target and services related to the target (e.g. Call Forwarding) on behalf of Law Enforcement Agencies. The Law Enforcement Agency (LEA) provides the intercept request (e.g., lawful authorization or warrant) to the CSP. The intercept request identifies, at a minimum, the target, the type of intercept (i.e., IRI-only, or IRI and CC) that is authorized, the authorized period for interception, and the LEA delivery address(es) for the intercepted information.

Telecommunications Service Provider (TSP) must help Law Enforcement Agency (LEA) in conducting lawfully authorized electronic surveillance in Telecommunications Networks. IP Multimedia Subsystem is able to provide multimedia services regardless of access network. In particular access information for VoLTE is provided by the Evolved Packet System, EPS, domain. Service information is provided by IMS. This is due to the different architecture, which is intended to offer more flexible multimedia services in an access independent way. From a lawful interception point of view the access independence of IMS network could lead to a duplication of interception information if both EPS and IMS domains are intercepted.

Indeed even if the same target is used to intercept a user on EPS and IMS domains, the intercepted information are reported with different correlation numbers from involved Network Elements and so the Mediation Function, MF, cannot correlate or filter them out.

The main drawback of this way of working is a useless duplication of intercepted information. Moreover since often a VoLTE call is encrypted into the access network, without a proper correlation the Law Enforcement Agency has no way to recognize it and so filter it out.

SUMMARY

One object of the following disclosure is to provide a technique enabling a mediation function (MF) to correlate intercepted information (i.e. CC and IRI)—coming from different nodes both in the access domain, EPS, and in core domain, IMS, without causing any impact on EPS and IMS network.

According to one aspect of the provided technique, a method and embodiments thereof, is provided. Said method enables detecting and correlating copies of Session Initiation Protocol, SIP, and Real-time Transport Protocol, RTP, flows, respectively, belonging to a communication session of an intercepted user, a target. Said session is established via an IP Multimedia subsystem, IMS, having a well-known Access Point Name, APN, which session is intercepted in an IMS domain by an Interception Access Point, IMS/IAP, and in an Evolved Packet System, EPS domain, by an Interception Access Point EPS/IAP. The interceptions result in the generation of copies of the session's SIP and RTP flows comprising flow identity information defined by a set of identifiers, triplet, comprising Lawful Interception Identity LI-ID and one of assigned IP user addresses IP_SIP or IP_RTP of the target. Said copies of SIP and RTP flows is received by a mediation function of a LI system. The method comprises the steps of determining a unique IMS Communication Identity Number, IMS CIN, and a corresponding correlation set of identifiers comprising correlation number of a default bearer, CN_def_B, correlation number of a dedicated bearer, CN_ded_B, and correlation number of the IMS, CN_IMS, for each intercepted communication session at Packet Data Protocol, PDP, context/Bearer set up and establishment event of the communication session via the IMS well-known APN, and storing each unique IMS CIN together with its correlation set for an intercepted communication session. The method further comprises the steps of correlating a SIP or RTP flow received from one domain to the same SIP or RTP flows of the same communication session received from the other domain by comparing the flow identity information of the received flow to the stored correlation sets for identifying a matching correlation set and its unique IMS CIN, and sending to a LEA requesting for LI of the target said received SIP or RTP flow comprising said identified unique IMS CIN for a matching correlation set enabling the LEA to match SIP and RTP flows of the same communication session regardless intercepted in an IMS domain or an EPS domain.

According to another aspect of the provided technique, a mediation device MD of Lawful Interception, LI, system and embodiments thereof are provided. Said mediation device enables detecting and correlating copies of Session Initiation Protocol, SIP, and Real-time Transport Protocol, RTP, flows, respectively, belonging to a communication session of an intercepted user, a target. Said session is established via an Internet Protocol Multimedia subsystem, IMS, having a well-known Access Point Name, APN, which session is intercepted in an IMS domain by an Interception Access Point, IMS/IAP, and in an Evolved Packet System, EPS domain, by an Interception Access Point EPS/IAP. The interceptions result in the generation of copies of the session's SIP and RTP flows comprising flow identity information defined by a set of identifiers, triplet, Lawful Interception Identity LI-ID and one of assigned IP user addresses IP_SIP or IP_RTP of the target. Said copies of SIP and RTP flows is received by the mediation device, which comprises a processing circuitry being adapted to operatively determining a unique IMS Communication Identity Number, IMS CIN, and a corresponding correlation set of identifiers comprising correlation number of a default bearer, CN_def_B, correlation number of a dedicated bearer, CN_ded_B, and correlation number of the IMS, CN_IMS, for each intercepted communication session at Packet Data Protocol, PDP, context/Bearer set up and establishment event of the communication session via the IMS well-known APN, and storing each unique IMS CIN together with its correlation set for an intercepted communication session. The processing circuitry is further adapted to operatively correlating a SIP or RTP flow received from one domain to the same SIP or RTP flows of the same communication session received from the other domain by comparing the flow identity information of the received flow to the stored correlation sets for identifying a matching correlation set and its unique IMS CIN, and sending to a LEA requesting for LI of the target said received SIP or RTP flow comprising said identified unique IMS CIN for a matching correlation set enabling the LEA to match SIP and RTP flows of the same communication session regardless intercepted in an IMS domain or an EPS domain.

According to another aspect of said technique, it is also provided a computer program comprising computer program code which, when run in a processor of a mediation device causes the device to perform the steps of the method as described above.

According to further one aspect of said technique, it is also provided a computer program product comprising a computer program and a computer readable means on which the computer program is stored.

According to an additional aspect of said technique, it is provided a carrier containing the computer program, wherein the carrier is one of an electronic signal, optical signal, radio signal or computer readable storage medium.

One advantage of the proposed solution is that LEAs will be able to correlate the communication session related to IMS telephony services intercepted both in the EPS and IMS domains without any changes of the report receiving and handling equipment at the LEA site. This solution will allow not only to correlate the information intercepted into access domain, EPS, with service domain, IMS, but also to filter out it depending on LEA needs e.g. avoid duplication, discarding encrypted content, etc.

Another valuable advantage of this solution is that not impacts are foreseen on existing nodes of EPS and IMS network.

BRIEF DESCRIPTION OF THE DRAWINGS

The foregoing, and other, objects, features and advantages of the proposed solution will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the correlation mechanism. However, it will be apparent to one skilled in the art that the technique may be practiced in other embodiments that depart from these specific details. In other instances, detailed descriptions of well known methods, devices, and circuits are omitted so as not to obscure the description of the mechanism with unnecessary detail.

The term flow is used herein and it means the stream of data packets sent between two nodes in a system.

Figure 1:
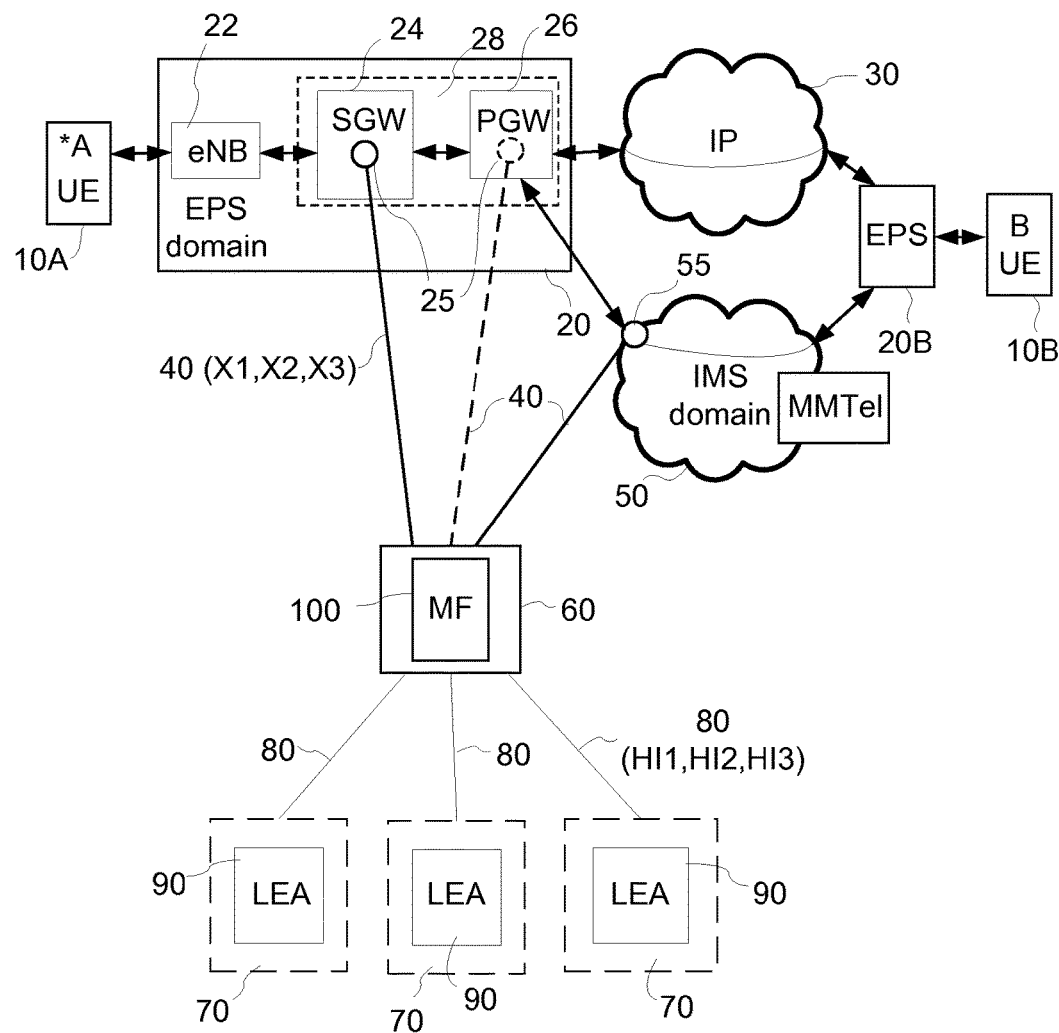
FIG. 1 is a block diagram of an exemplary network in which functions and methods described herein may be implemented.

FIG. 1 is a block diagram illustrating a communications system enabling lawful interception of a Voice over LTE call involving an intercepted user and his mobile user equipment.

The system supporting Voice over LTE (VoLTE) call comprises Evolved Packet Systems (EPSs) 20, 20B to which to which mobile user equipments (UEs) 10 (10A, 10B) may attach over a radio interface. The EPS domain comprises one or more radio base stations eNB (evolved Node Base station) 22 for enabling the attachment and establishing of an operating radio link connection between the UEs and eNB 22. The EPS domain comprises further Evolved Packet Core (EPC) 28. The EPC comprises a Serving Gateway (SGW) 24 and a Packet Data Network Gateway (PDN) 26.

Serving GW 24 is the gateway which terminates the interface towards the access network (E-UTRAN). For each UE associated with the EPS, at given point of time, there is a single Serving GW. SGW is responsible for handovers with neighboring eNB's, also for data transfer in terms of all packets across user plane. To its duties belongs taking care about mobility interface to other networks such as 2G/3G. SGW is monitoring and maintaining context information related to UE during its idle state and generates paging requests when arrives data for the UE in downlink direction.

(e.g. somebody's calling). SGW is also responsible for replication of user traffic in case of LI.

The PGW is the gateway which terminates the SGi interface towards Patent Data Networks, e.g. the Internet (IP) 30, IMS 50, etc. PGW is responsible to act as an "anchor" of mobility between 3GPP and non-3GPP technologies. PGW provides connectivity from the UE to external PDN by being the point of entry or exit of traffic for the UE. The PGW manages policy enforcement, packet filtration for users, charging support and LI.

The IMS 50 supports MultiMedia Telephony (MMTel). The voice over LTE solution is defined in the GSMA Permanent Reference Document (PRD) IR.92 based on the adopted One Voice Industry Initiative.

Voice over LTE is therefore based on the existing 3GPP IMS MMTel standards for voice and SMS over LTE specifying the minimum requirements to be fulfilled by networks operators and terminal vendors in order to provide a high quality and interoperable voice over LTE service. For the understanding of VoLTE and EPS, the bearer concept is important. A bearer is just a virtual concept. It defines how a flow of data is treated when it travels across the EPS core network. In short, bearer is a set of network parameter that defines data specific treatment, e.g. a person A will always get at least 256 Kbps download speed on his LTE phone while for person B there is no guaranteed bit rate and might face extremely bad download speed at times. When an LTE UE attaches to the access network for the first time, it will be assigned a default bearer which remains as long as the UE is attached. A default bearer provides best effort service. Each default bearer comes with an IP address. UE can have additional default bearers as well. Each default bearer will have a separate IP address.

Dedicated bearers provide a dedicated tunnel to one or more specific traffic (i.e. VoIP, video, etc). The dedicated bearer acts as an additional bearer on top of default bearer. It does not require a separate IP address due to the fact that only an additional default bearer needs an IP address and, therefore, a dedicated bearer is always linked to one of the default bearer established previously. For services like VoLTE, a dedicated bearer provide better user experience and this is where would come handy. Dedicated bearer uses Traffic flow templates (TFT) to give special treatment to specific services.

A value of a "Linked EPS bearer identity" is defined in the setup information of a dedicated bearer, which value is used for linking a dedicated bearer to a default bearer.

Usually LTE networks with VoLTE implementations have two default and one dedicated bearer. For example, one default bearer is used for signaling messages, such as SIP signaling, related to IMS network. The dedicated bearer is used for VoLTE VoIP traffic. A second default bearer may be used for all other smartphone traffic, e.g. video, chat, email, browser, etc.

The IMS network 50 is a separate network from normal internet 30. And it comes with its own APN. A separate default bearer is therefore needed for the IMS network. This also helps in separating IMS traffic, i.e. SIP and RTP flows from normal internet traffic, i.e. IP traffic, as well.

Both UE and eNB has TFT which has rules for certain services. For example, in case of VoLTE VoIP traffic, the rule is defined on the basis of protocol number, destination network, IP network, etc.

In a typical example, the Default bearer is used for signalling messages (SIP signalling) related to the IMS network. The Dedicated bearer is used for VoLTE VoIP traffic and is linked to the Default bearer.

The traffic is separated thanks to the TFT rules: Both UE and eNB has have rules for certain services.

From a UE perspective IMS defines a set of protocols to be used: Session Initiation Protocol (SIP), SigComp, Real-time Transport Protocol (RTP), RTP Control Protocol (RTCP) and IP Security. Other protocol such as Diameter is involved in the IMS core but is transparent to the User Equipment.

To ensure the affinity with internet and to promote spreading multimedia services, IMS adopts architecture and protocol based on Internet Engineering Task Force, IETF. The Session Initiation Protocol (SIP) is a protocol for initiating, modifying, and terminating an interactive user session involving multimedia elements such as video, voice, and also applications such as instant messaging and online gaming. SIP is a text-based protocol client/server protocol completely independent from the lower layers such as TCP/IP. SIP is a signaling protocol; the transport of the media is carried by the RTP/RTCP protocols.

The SIP is widely used in traditional Voice over IP such as Skype or FaceTime. However, combining it's usage with IMS allows operators to bring, in theory better security, quality of service and scalability.

While the SIP protocol is used for IMS signaling, its mandatory counterpart, the RTP/RTCP must be supported to deliver data. The Real-time Transport Protocol (RTP) defines a standardized packet format for delivering audio and video over IP networks. RTP is used extensively in streaming applications such as telephony, video teleconference applications, and web-based push-to-talk features.

RTP is used in conjunction with the RTP Control Protocol (RTCP). While RTP carries the media streams (e.g., audio and video), RTCP is used to monitor transmission statistics and quality of service (QoS) and aids synchronization of multiple streams.

Telecommunications Service Provider (TSP) must help Law Enforcement Agency (LEA) in conducting lawfully authorized electronic surveillance in telecommunications networks.

Network layer interception requires a copy of all signaling information, i.e. SIP Messages, as well as call content via RTP exchanged in the platform to be available at different points in the infrastructure. A Lawful Interception system comprising a LI management system 60 enables such authorized electronic surveillance by means of Interception Access Points (IAPs), which are distributed and connected to different nodes, e.g. routers, gateways, etc., of the network. Traffic flows of data packets passing through an IAP are intercepted if the flows and streams belong to persons, denoted targets, under surveillance of a LEA.

In the example of FIG. 1, one IAP 25 is situated in the EPS domain and one IAP 55 is situated in the IMS domain. The IAP 25, 55 comprises a device for enabling interception. The EPS/IAP 25 may situated in the SGW 24, or in PGW 26, or in both gateways, and the IMS/IAP 55 in a node of the IMS domain. Thus, target flows passing through the SGW 24 are intercepted by the EPS/IAP 25 and target flows passing through the node of the IMS domain are intercepted by the IMS/IAP 55.

Copies of the intercepted flows are delivered from the IAPs to a mediation function, MF, in a mediation device, MD, 100 of the LI system via interfaces 40. Said interfaces 40 comprise separated interfaces X1, X2 and X3. Interface X1 is dedicated for communication to and control of an IAP by a TSP. Interface X2 is dedicated for deliverance of Interception Related Information (IRI), e.g. SIP signalling flows, and interface X3 is dedicated for deliverance of Communication Content (CC), e.g. RTP flows comprising the call content data packets, from the IAP to the MF. The MD 100 enables reporting the received flow copies to one or more LEAs 90 in the LEA domain 70 (separated from the domain of TSPs) via interfaces 80.

Said interfaces 80 comprise separated interfaces HI1, HI2 and HI3. Interface HI1 is dedicated for communication of instructions, e.g. interception requests of a target, from a LEA to the MF of a TSP. Interface HI2 is dedicated for reporting the received IRI and interface HI3 is dedicated for reporting received CC from the MF to a LEA.

In the specific case of Voice over LTE service, a call establishment is performed by using the IMS network. The IMS Signaling is sent over the default bearer, and a new dedicated bearer, linked to the default one, is dynamically established for the voice traffic.

Figure 2:
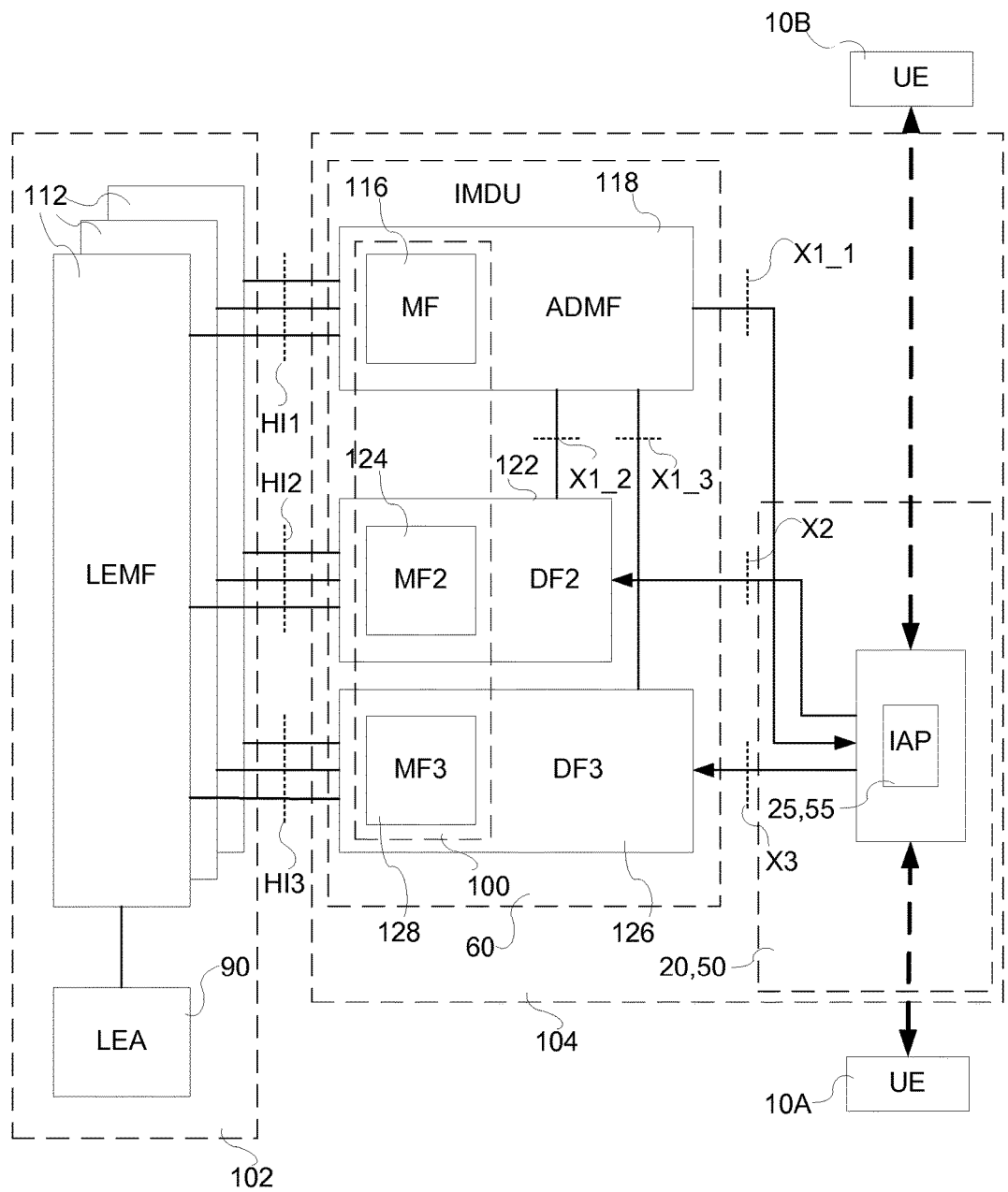
FIG. 2 is block diagram illustrating a LI system in more details.

FIG. 2 is illustrating a LI management system 60 of a LI system in more details.

Said system and network comprises a number of entities. The exemplary LI system is divided into a LEA domain 102 and operator domain 104. The LEA domain 102 comprises a Law Enforcement Management Function, LEMF, 112 for requesting LI services of the LI system and collecting the intercepted information from the operator domain 104. The system shall provide access to the intercepted Content of Communications, CC, and Intercept Related Information, IRI, of a target and services related to the target on behalf of one or more Law Enforcement Agencies, LEAs 90. A target is a person of interest and/or user equipment possessed or used by the person of interest being surveyed by the LEA. An intercept request, also denoted Request for LI activation, is sent through a first Handover Interface, HI1, located between the Law Enforcement Management Function 112 and a LI management system comprising an Intercept Mediation and Delivery Unit, IMDU, 60.

The LI management system and the IMDU 60 comprises a first Mediation Function, MF, 116 and an Administration Function, ADMF, 118.

Said first Mediation Function 116 and Administration Function 118 generate based on said received request a warrant comprising said one or more target 10A, 10B identities, and sends said warrant towards Interception Access Point, IAP, 25, 55 via an interface denoted X1_1. The IAP 25, 55 comprises a device for enabling interception and it is connected to a node of a network, e.g. the Internet, a 3GMS (third generation Mobile Communications System), an Evolved Packet System (EPS), IMS, LTE etc, from which it intercepts said Content of Communications and Intercept Related Information of a mobile target. Said CC and IRI are network related data. As reference to the standard model, the content of communication is intercepted in the IAP network node and it is based upon duplication of target communication payload without modification.

The LI management system and the IMDU 60 further comprises a Delivery Function for IRI reporting, DF2, 122 and a Mediation Function of IRI, MF2, 124 that generates and delivers to a collection functionality a standardized IRI report based on the received IRI report. The IAP sends IRI raw data via an interface X2 to the Delivery Function for IRI reporting, DF2, 122 and the Mediation Function of IRI, MF2, 124 generates and delivers to a the standardized IRI report based on the received IRI raw data. Said standardized IRI report is sent over a standardized interface HI2 to the LEMF 112.

The LI management system and the IMDU 60 further comprises a Delivery Function for CC reporting, DF3, 126 and a Mediation Function of CC, MF3, 128 which generates and delivers to a collection functionality a standardized CC report based on the received CC report. The IAP 25, 55 sends CC raw data via an interface X3 to the Delivery Function for CC reporting, DF3, 126 and the Mediation Function of CC, MF3, 128 which generates and delivers a standardized CC report based on the received CC raw data. Said standardized CC report is sent over a standardized interface HI3 to the requesting LEMF 112. The ADMF entity 116 controls and communicates with the Mediation Function and Delivery Function for IRI reporting, MF2/DF2, via the interface X1_2 and the Mediation Function and Delivery Function for CC, MF3/DF3, via the interface X1_3.

Together with the delivery functions it is used to hide from the third generation (3G) Intercepting Access Point IAP entities that there might be multiple activations by different Lawful Enforcement Agencies on the same target.

The HI2 and HI3-interfaces represent the interfaces between the LEA and two delivery functions. The delivery functions are used:

to distribute the Intercept Related Information (IRI) to the relevant LEA(s) via HI2;

to distribute the Content of Communication (CC) to the relevant LEA(s) via HI3.

Herein, the first mediation function 116, mediation function MF2 124 for IRI and the mediation function MF3 for CC constitute a mediation function MF in a mediation device 100.

In VoLTE SIP and RTP flows are intercepted in both the EPS and IMS domain. This fact causes a problem that will be further explained by means of FIG. 3.

Figure 3:
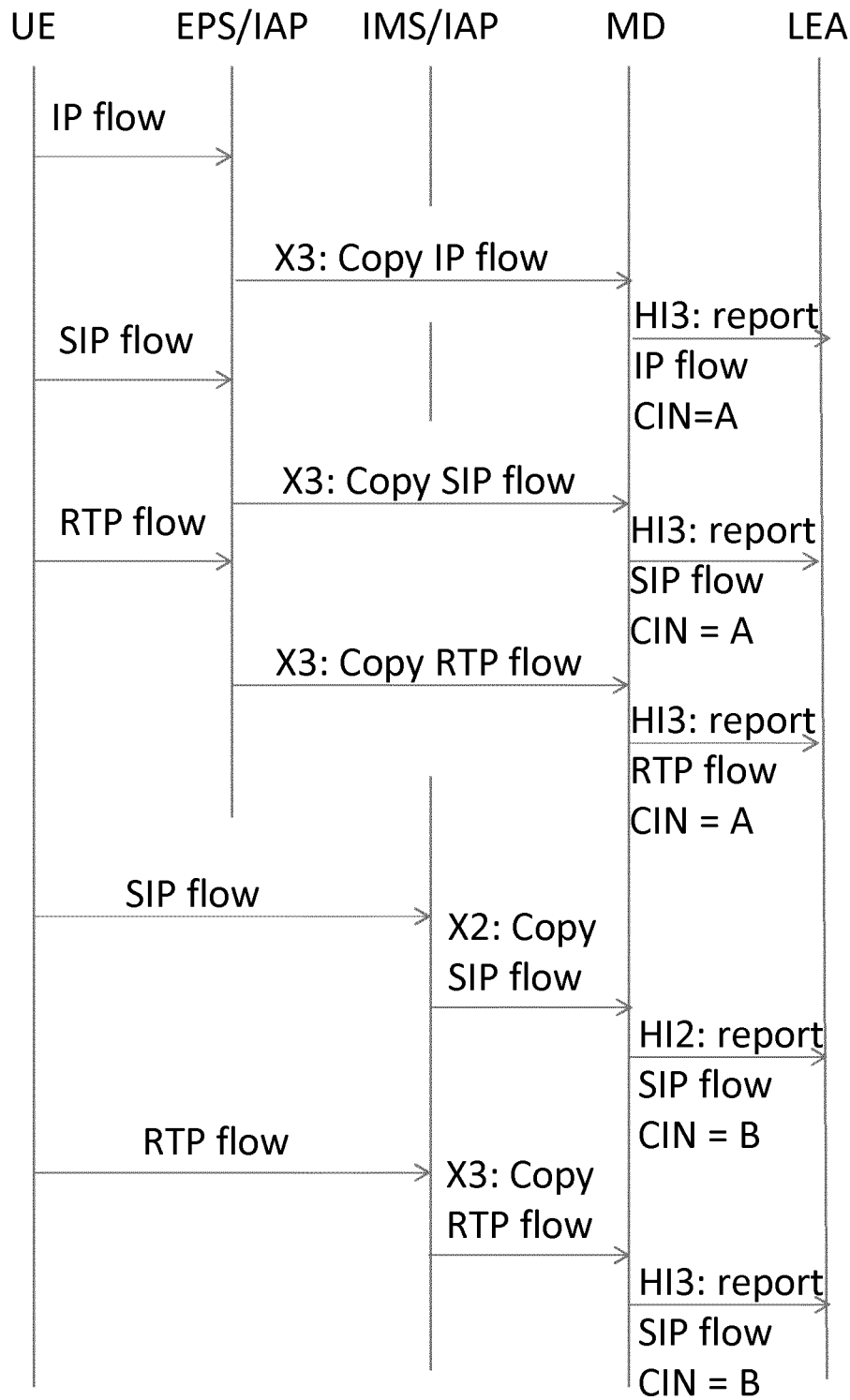
FIG. 3 is a signaling scheme illustrating a prior art Mediation Device handling flows in LI systems.

FIG. 3 is a signaling scheme illustrating a prior art MD handling flows in LI systems.

Communication Identity Number, CIN, is one significant field that identifies uniquely an intercepted communication session within the relevant network elements. All the results of interception, within a single communication session, should have the same CIN; it's present, in several form, in almost every Handover Interface. Network in which Voice over Packet (VoP) Technology is used this field becomes hard to maintain as usually there are several nodes involved in signaling (for example SIP Proxies). According to prior art, as soon as a default bearer and a dedicated bearer activation, or establishment, events is intercepted causes the MD 100 to generate a value of the identifier CIN, i.e. CIN=A, for the communication session. These events (i.e. bearer activation), in case of Voice over LTE interception, contains the "well-known" APN associated to a UE connected to the EPS/IAP node intercepting the communication session.

However when the SIP and RTP flows are intercepted in the access network, the EPS/IAP node is not able to distinguish it from a simple IP flow interception (i.e. internet traffic) since it just works at "IP level". So SIP and RTP flows and generic Internet flows are all delivered via the X3 interface to the MD 100 and from the MD on HI3 with CIN=A (i.e. the same CIN used for the related events of bearer activation). A LEA is therefore not capable to identify and distinguish SIP and RTP flows from IP flows since they are identified by the same CIN, i.e. CIN=A.

Further, SIP and RTP flows are intercepted on the IMS side and delivered by MD to the LEA with a different value on CIN, e.g. CIN=B, since the MD has no information to correlate them with the ones intercepted on access network. Thus, the SIP and RTP flows belonging to the same communication session are delivered to the LEA from both the LTE access network and the core network, IMS with a different CIN. So the LEA will not be able to neither correlate identical SIP and RTP flows from the access network and the core network, nor to distinguish SIP and RTP flows from IP flows when intercepted at access side.

A technique is hereafter described to solve said problem.

The solution refers in particular to the possibility of exploiting the relationship between the EPS domain and IMS domain for the purpose of correlate the LI information received from both domains.

The solution involves a number of identifiers to be handled by the LI system. Different identifiers are used for identifying a communication session and SIP and RTP flows related to said communication session.

To facilitate roaming for IMS based services, especially Voice over LTE roaming, an IMS "well-known" Access Point Name (APN) used for IMS services is defined. For SIP signaling, the IMS application must use the IMS well known APN as defined in PRD IR.88 [LTE Roaming Guidelines, Version 9.0, 24 Jan. 2013], any other application must not use this APN.

An intercepted user, target, is identified by a Lawful Identification Identity, LI-ID, number set by the LI system, preferably the mediation function. This number is present in all copies of the SIP and RTP flows.

A SIP flow is further carrying an assigned IP user address, IP_SIP. For an RTP_flow the corresponding assigned IP user address is denoted RTP_IP. IP_SIP is the same as IP_RTP for the same user, in the case of LI it's the target's address.

Further, the correlation numbers, CN, for the default bearer CN_def_B, for the dedicated bearer CN_ded_B, and for the IMS CN_IMS are used as identifiers. Said correlation numbers are generated by the EPS and IMS systems.

A set of identifiers constitutes the flow identity information carried by the flow data packets.

Thus, a SIP flow received from the IMS/IAP comprises the flow identity information CN_IMS, IP_SIP and LI-ID.

A SIP-flow received from the EPS/IAP comprises the flow identity information CN_def_B, IP_SIP and LI-ID.

An RTP flow received from the IMS/IAP comprises the flow identity information CN_IMS, IP_RTP and LI ID.

An RTP flow received from the EPS/IAP comprises the flow identity information CN_ded_B, IP_RTP and LI-ID.

The MF has the capability to detect and store the IMS well know APN configured into the network. In addition the lawful interception triggers created on both EPS and IMS nodes must share the same LI-ID (Lawful Interception Identifier/Identity).

When the User Equipment performs the network attach procedure a default Bearer for IMS signaling is activated and established. The Mediation Device 100 receives this event and detect and store the assigned IP user Address that shall be used for the IMS signaling, IP_SIP.

In addition the MF detects and stores the Correlation Number related to the received default Bearer Activation event CN_def_B linked to the IMS well known APN. The succeeding intercepted data will be delivered to the MF with this CN_def_B. This intercepted SIP flow shall carry the IMS signaling.

IMS signaling is intercepted from IMS nodes as well. The MF is capable to retrieve the Correlation Number for each IMS Service session, CN_IMS, and correlate it with the CN_def_B value. The MF delivers towards the LEA the IMS event information inserting both the CN_IMS and the CN_def_B values allowing the agency to correlate and/or filter the redundant information coming from the access network.

Given these assumptions all kind of IMS service events coming from both domains can be correlated and then eventually filtered out by the agency.

Figure 4:
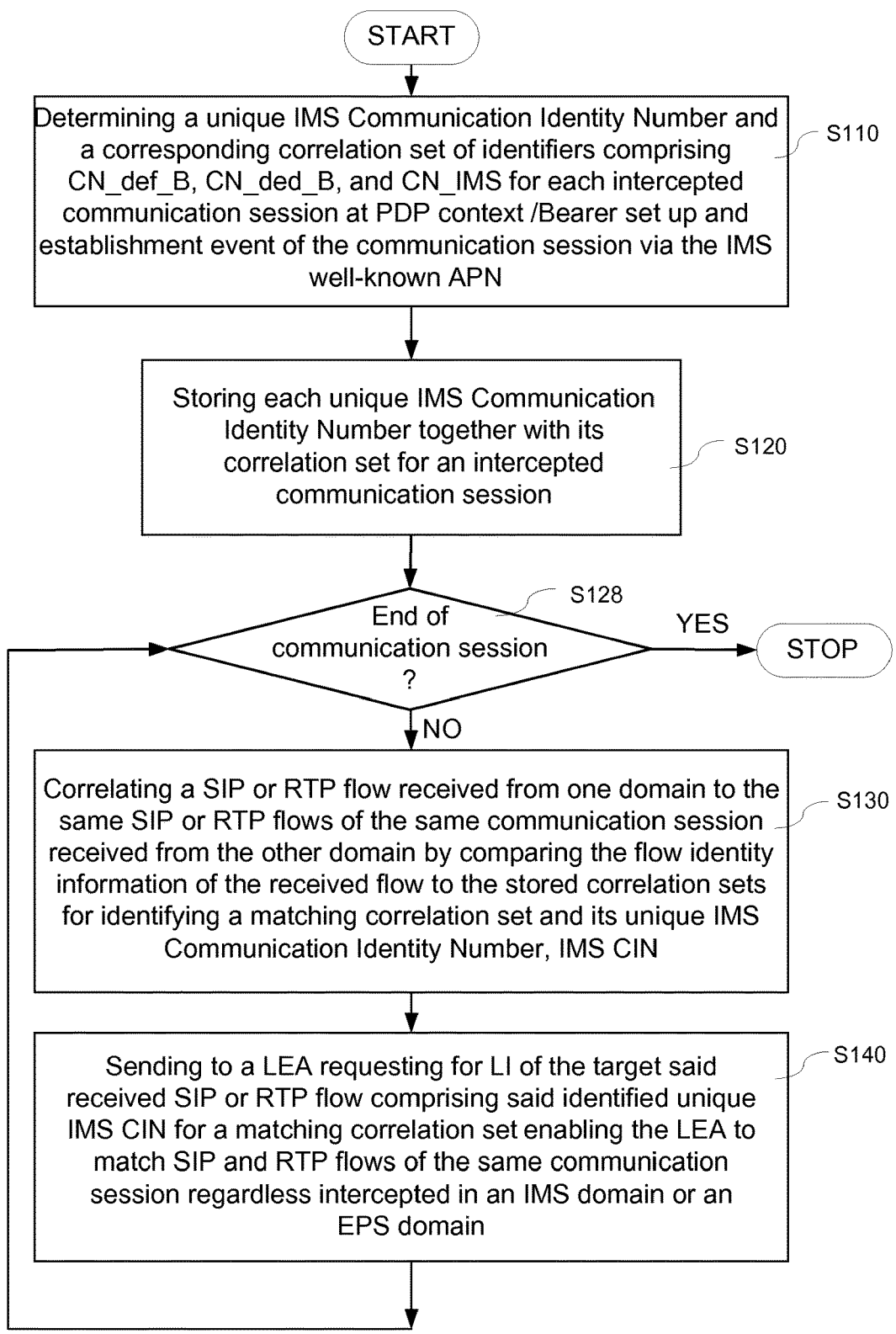
FIG. 4 is a flowchart illustrating a method for solving the problem to detect and correlate SIP and RTP flows.

FIG. 4 is a flowchart of a method for detecting and correlating SIP and RTP flows comprising identical content belonging to a communication session of a target.

The method, S100, provides a technique for detecting and correlating copies of SIP and RTP flows, respectively, belonging to a communication session of an intercepted user, a target.

Said session is established via an IMS having a well-known Access Point Name (APN), which session is intercepted in an IMS domain by an IMS/IAP and in an EPS domain by an EPS/IAP. The interception result in the generation of copies of the session's SIP and RTP flows comprising flow identity information defined by a set of identifiers, triplet, comprising LI-ID and one of IP_SIP or IP_RTP of the target, and identical content. Said copies of SIP and RTP flows being received by a mediation function of a LI system, wherein the method comprises the steps of:

S110:—Determining a unique IMS Communication Identity Number, IMS CIN, and a corresponding correlation set of identifiers comprising CN_def_B, CN_ded_B, and CN_IMS for each intercepted communication session at Packet Data Protocol, PDP, context/Bearer set up and establishment event of the communication session via the IMS well-known APN;

S120:—Storing each unique IMS CIN together with its correlation set for an intercepted communication session;

S130:—Correlating a SIP or RTP flow received from one domain to the same SIP or RTP flows of the same communication session received from the other domain by comparing the flow identity information of the received flow to the stored correlation sets for identifying a matching correlation set and its unique IMS CIN;

S140:—Sending to a LEA requesting for LI of the target said received SIP or RTP flow comprising said identified unique IMS CIN for a matching correlation set enabling the LEA to match SIP and RTP flows of the same communication session regardless intercepted in an IMS domain or an EPS domain.

In step S110, a unique value of the IMS Communication Identity Number, IMS CIN, is determined for each intercepted communication session. Further, a correlation set of identifiers is determined and linked to said IMS CIN. The IMS CIN is linked to the correlation set and they are stored together, see S120, by the mediation function with other IMS CIN and correlation sets in the mediation device 100.

Said stored correlation sets are used for correlating, in S130, SIP or RTP flows received from one domain to the same SIP or RTP flows of the same communication session received from the other domain. Said correlation is performed by comparing the flow identity information of the received flow to the stored correlation sets. When the flow identity information of the received flow is matching a certain correlation set, said flow receives the corresponding unique IMS CIN belonging to said correlation set. Thus, both SIP or RTP flows of the same communication session will have matching identifier values in the correlation set.

In step S140, the MD 100 delivers to a LEA requesting for LI of the target said received SIP or RTP flow comprising said identified unique IMS CIN for a matching correlation set. The MD 100 and its MF is adapted to match SIP and RTP flows of the same communication session by inserting the same CIN value regardless whether the RTP and SIP flow is intercepted in an IMS domain or an EPS domain.

The processes will be stopped, if the criterion "End of communication session" is fulfilled, YES, in step S128.

The different steps of the method will now be described in more detail with reference to FIGS. 5 to 7.

Figure 5:
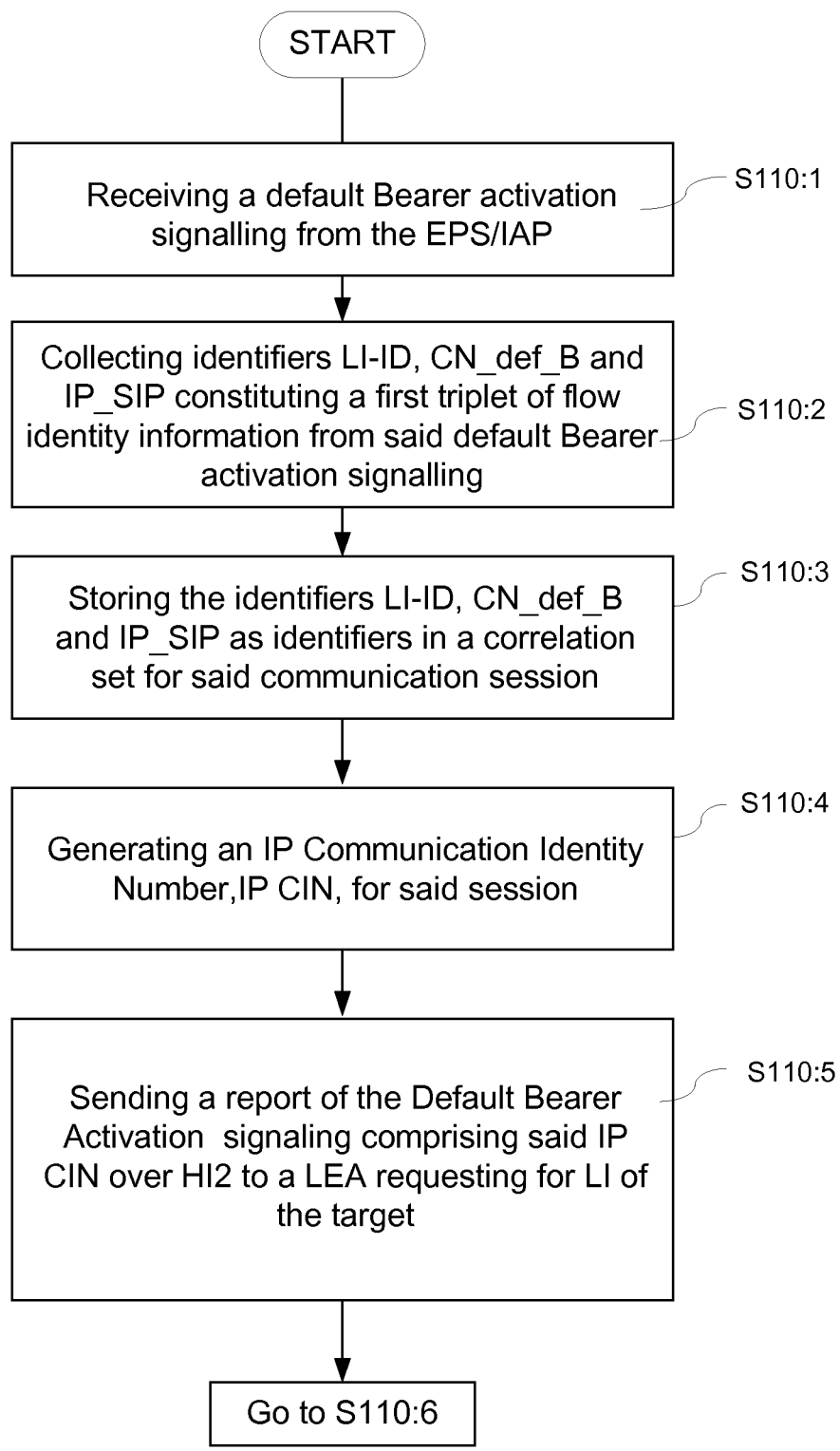
FIG. 5 is a flowchart illustrating some of the sub-steps of the determining step in the method.

FIG. 5 is a flowchart illustrating some of the sub-steps of step S110.

The method step S110 comprises following steps for determining a correlation set:

S110:1:—Receiving a default Bearer activation signalling from the EPS/IAP;

S110:2:—Collecting identifiers LI-ID, CN_def_B and IP_SIP constituting a first triplet of flow identity information from said default Bearer activation signalling;

S110:3:—Storing the identifiers LI-ID, CN_def_B and IP_SIP as identifiers in a correlation set for said communication session.

The step S110 may further involve the steps of,

S110:4:—Generating an IP Communication Identity Number, IP CIN, for said communication session; and S110:5:—Sending a report of the Default Bearer Activation signaling comprising said IP Communication Identity Number IP CIN over HI2 to a LEA requesting for LI of the target.

During the communication session establishment event of a target, a default Bearer activation signaling is started. Said signaling is intercepted in the EPS domain only, by the EPS/IAP, and reported to the MF in the MD 100.

Said signaling comprises the identifiers LI-ID, CN_def_B and IP_SIP constituting a first triplet of flow identity information. Said identifiers are collected, S110:2, and stored, S110:3, in a correlation set for said communication session.

A value for the IP Communication Identity Number, IP CIN, for said communication session may be generated, S110:4. It is used for identifying IP traffic intercepted in the EPS domain. A report of the Default Bearer Activation signaling comprising said IP Communication Identity Number IP CIN is sent, S110:5, over HI2 to a LEA requesting for LI of the target.

Figure 6:
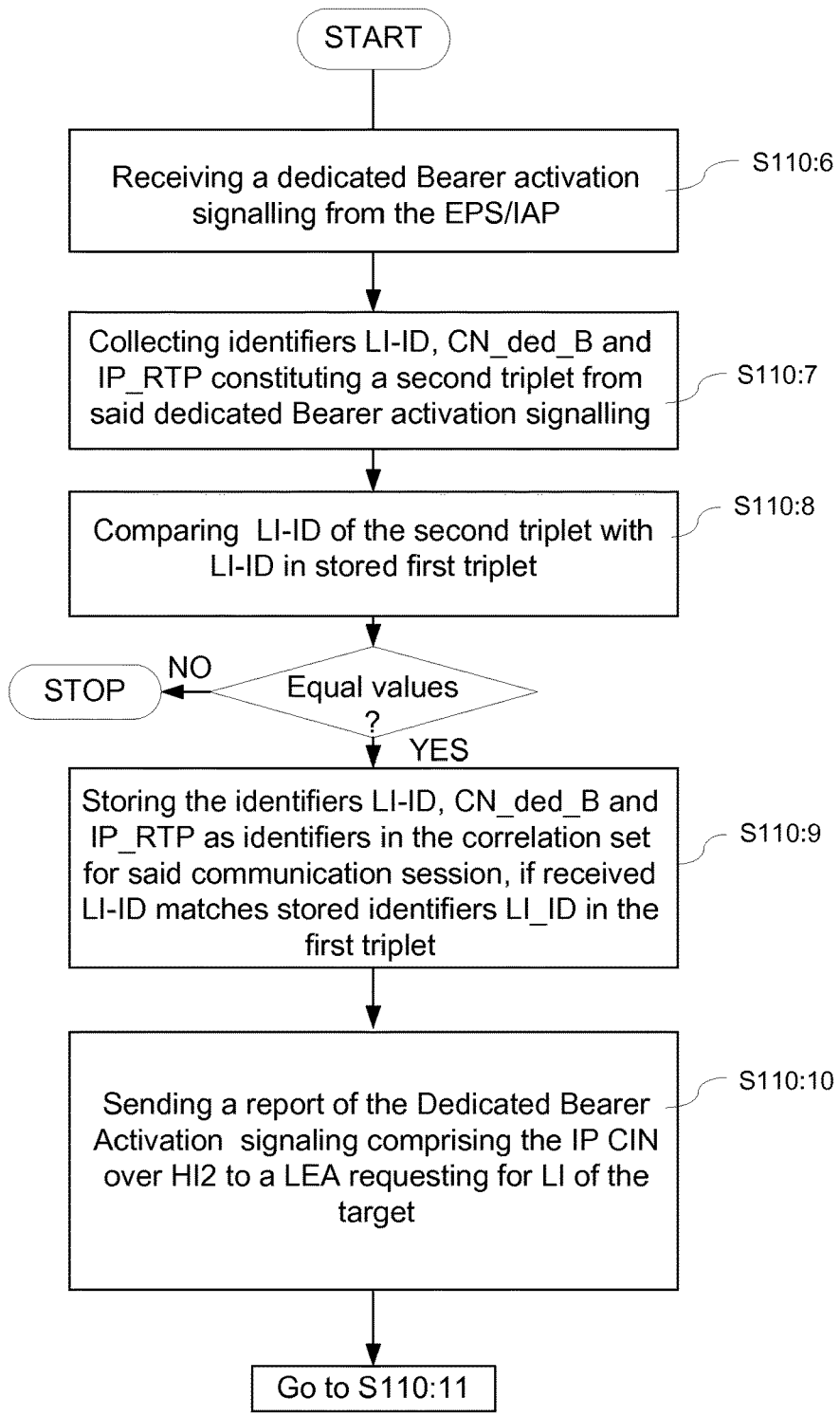
FIG. 6 is a flowchart illustrating further sub-steps of the determining step in the method.

FIG. 6 is a flowchart illustrating further some of the sub-steps of step S110.

The method step S110 further comprises following steps for determining a correlation set:

S110:6:—receiving a dedicated Bearer activation signalling from the EPS/IAP;

S110:7:—Collecting identifiers LI-ID, CN_ded_B and IP_RTP constituting a second triplet from said dedicated Bearer activation signalling;

S110:8:—Comparing LI-ID of the second triplet with LI-ID in stored first triplet;

S110:9:—Storing the identifiers LI-ID, CN_ded_B and IP_RTP as identifiers in the correlation set for said communication session, if the received LI-ID matches stored identifiers LI-ID in the first triplet;

S110:10:—Sending a report of the Dedicated Bearer Activation signaling comprising the IP CIN over HI2 to a LEA requesting for LI of the target.

During the communication session establishment event of a target, a dedicated Bearer activation signaling is performed. Said signaling is intercepted in the EPS domain only, by the EPS/IAP, and reported to the MF in the MD 100.

Said signaling comprises the identifiers LI-ID, CN_ded_B and IP_RTP constituting a second triplet of flow identity information. Said identifiers are collected, S110:7, and stored, S110:9, in the correlation set for said communication session, if the received LI-ID matches stored identifiers LI-ID in the first triplet. LI-ID of the second triplet is compared with LI-ID in stored first triplet in step S110:8, and if said values are equal, the triplet is stored, S110:9. If the values are different, NO, the process is stopped. A report of the Dedicated Bearer Activation signaling comprising said IP Communication Identity Number CIN=IP CIN is sent, S110:10, over HI2 to a LEA requesting for LI of the target.

Figure 7:
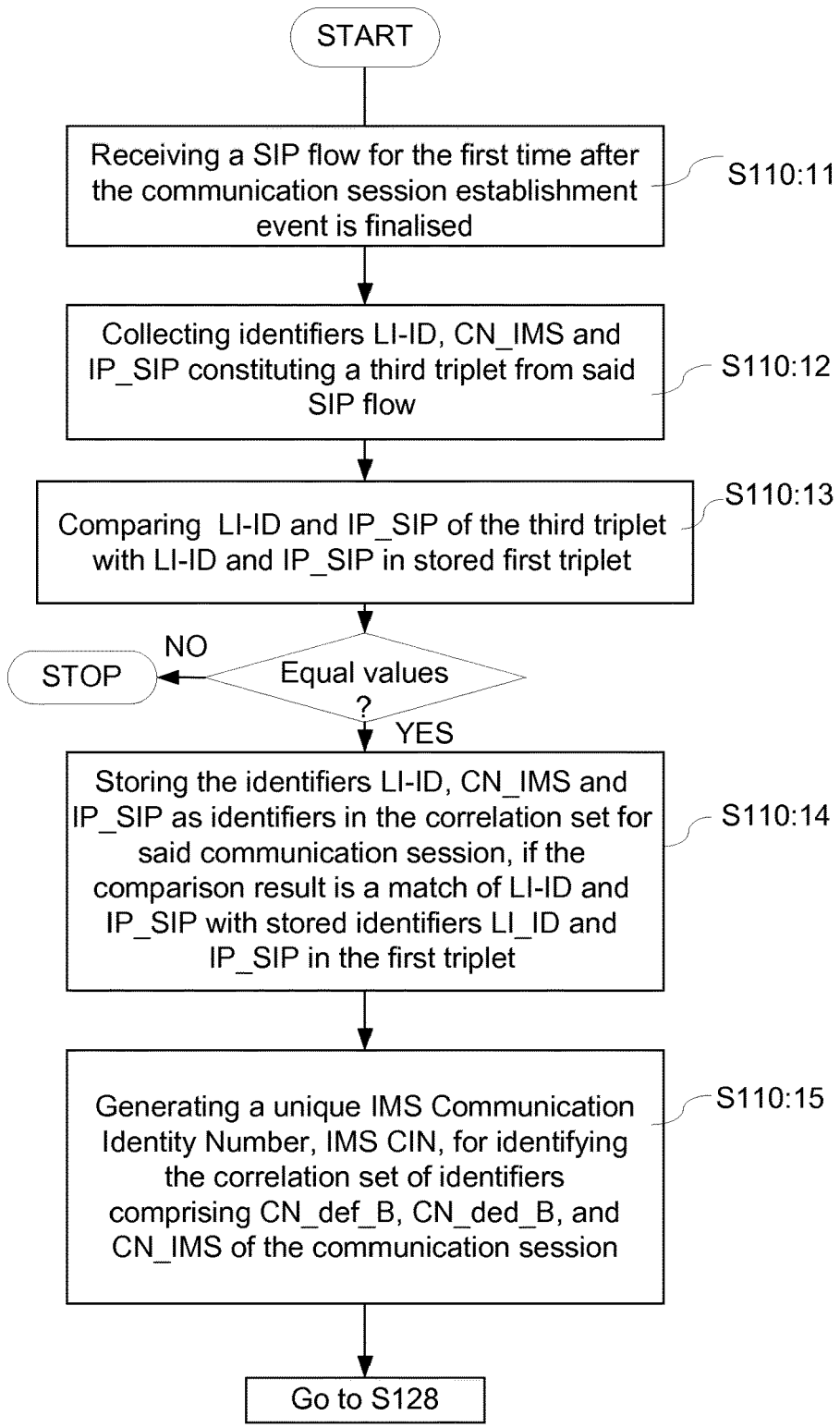
FIG. 7 is a flowchart illustrating additional sub-steps of the determining step in the method.

FIG. 7 is a flowchart illustrating some of the sub-steps of step S110.

The method step S110 thus comprises following steps for determining a correlation set:

S110:11:—Receiving a SIP flow for the first time after the communication session establishment event is finalised;

S110:12:—Collecting identifiers LI-ID, CN_IMS, IP_SIP constituting a third triplet from said SIP flow;

S110:13:—Comparing LI-ID and IP_SIP of the third triplet with LI-ID and IP_SIP in stored first triplet;

S110:14:—Storing the identifiers LI-ID, CN_IMS and IP_SIP as identifiers in the correlation set for said communication session, if the comparison result is a match of LI-ID and IP_SIP with corresponding identifiers in the first triplet;

S110:15:—Generating a unique IMS Communication Identity Number, IMS CIN, for identifying the correlation set of identifiers comprising CN_def_B, CN_ded_B, and CN_IMS of the communication session.

When the communication session establishment event is finalized, a SIP flow is received for the first time. Said SIP flow is a copy of a SIP flow intercepted by the IMS/IAP, and the SIP flow copy comprises identifiers LI-ID, CN_IMS, IP_SIP constituting a third triplet. Said triplet is collected, S110:12, and stored, S110:14, the identifiers LI-ID, CN_IMS and IP_SIP as identifiers in the correlation set for said communication session, if the comparison result is a match of LI-ID and IP_SIP with corresponding identifiers in the first triplet. The LI-ID and IP_SIP of the third triplet is compared with LI-ID and IP_SIP in stored first triplet in step S110:13, and if the values are equal the triplet is stored, S110:14. If the values differ, the process is stopped.

A unique IMS Communication Identity Number, IMS CIN, is generated by the MF in the MD 100 at the reception of the first SIP flow from the IMS/IAP. The IMS CIN is used for identifying the correlation set of identifiers comprising CN_def_B, CN_ded_B, and CN_IMS of the communication session. The IMS CIN is used for all reporting of RTP and SIP flows of a special communication session regardless if the flow is intercepted in the EPS or IMS domain. Thus, the LEA is able to correlate said RTP and SIP flows of a special communication session regardless if the flow is intercepted in the EPS or IMS domain.

Figure 8:
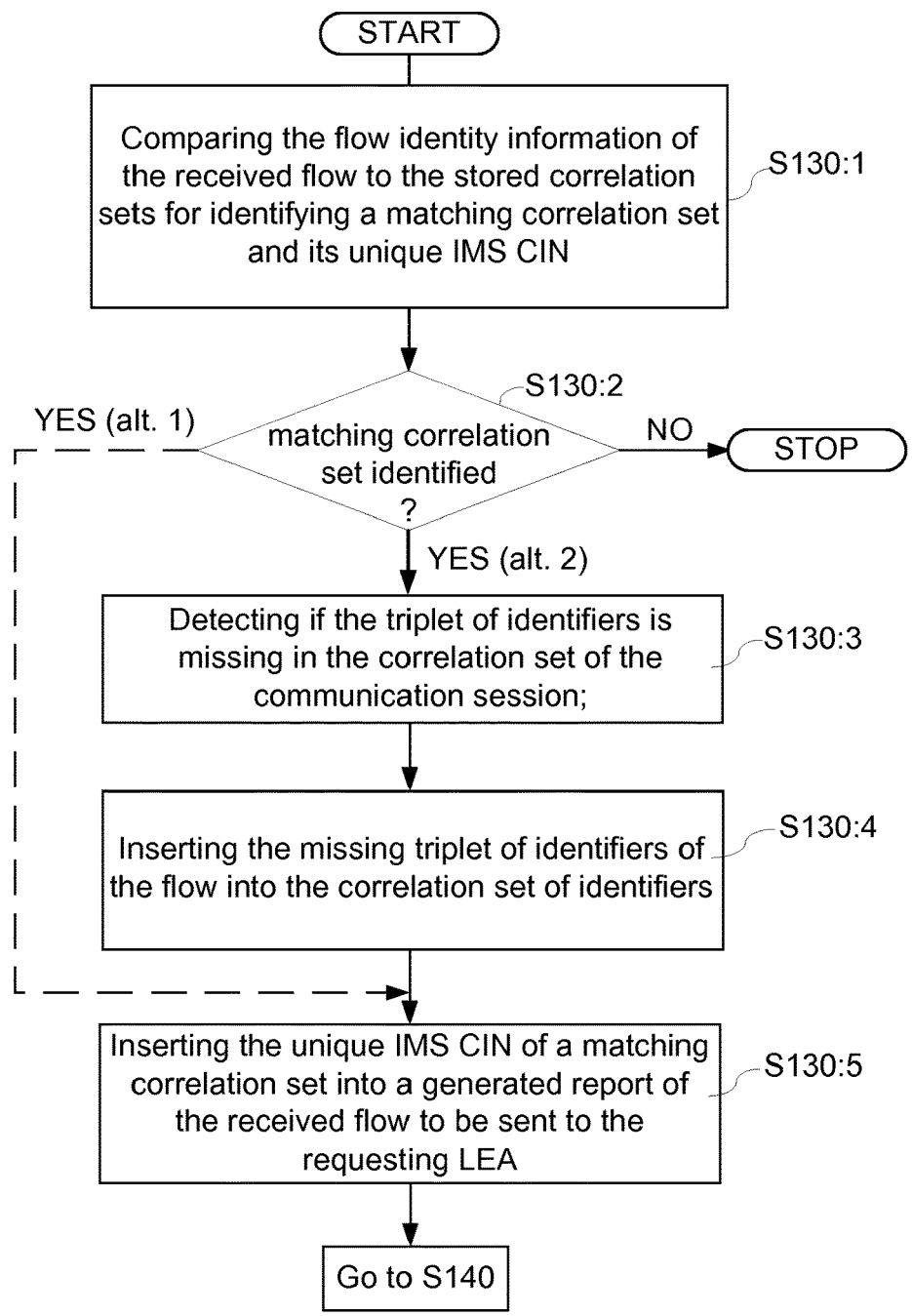
FIG. 8 is a flowchart illustrating the sub-steps of the correlating step of the method.

FIG. 8 is a flowchart illustrating the sub-steps of step S130.

In step S130, a received SIP or RTP flow from one domain, EPS or IMS, is correlated to the same SIP or RTP flows of the same communication session received from the other domain, IMS or EPS. They are correlated by comparing the flow identity information of the received flow to the stored correlation sets for identifying a matching correlation set and its unique IMS CIN.

According to one embodiment of the method, the method may comprise following steps:

S130:1:—Comparing the flow identity information of the received flow to the stored correlation sets for identifying a matching correlation set and its unique IMS CIN; and S130:2:—Matching correlation set identified?

S130:5:—Inserting the unique IMS CIN of a matching correlation set into a generated report of the received flow to be sent to the requesting LEA.

The mediation function MF of the MD 100 is adapted to collect the flow identity information of the received flow and to compare the flow identity information to the stored correlation sets for identifying a matching correlation set and its unique IMS CIN. If a matching correlation set comprising flow identity information of identifiers of the received flow is identified, YES (alt. 1) S130:2, the unique IMS CIN of the matching correlation set is inserted into a report of the received flow, which is to be sent to the requesting LEA, S130:5. If no matching correlation set is found, NO, the search is stopped and the method starts handling a new received SIP or RTP flow as long as the communication session is ongoing, S128.

According to yet one embodiment of the method, alternative 2 (alt. 2), the correlating step S130 may comprise steps for completing a matching correlation set comprising flow identity information of identifiers of the received flow with missing flow identity information. Step S130 may therefor involve the steps of:

S130:3:—Detecting if the triplet of identifiers is missing in the correlation set of the communication session; and S130:4:—Inserting the missing triplet of identifiers of the flow into the correlation set of identifiers.

If the condition in step S130:2, YES (alt.2), a matching stored correlation set is identified by means of the flow identity information of identifiers. Said flow identity information of identifiers of the received flow is a triplet depending on where it is intercepted, in the EPS domain or IMS domain, and if it is a SIP or RTP flow. These triplets are stored in the correlation set of a communication session in the MD 100 when they are received for the first time. In step S130:3, it is checked and detected, whether the triplet of identifiers of the flow is missing in the correlation set of the communication session to which the flow belongs, or not. If the flow identity triplet is not missing, the MD performs the step S130:5. If the flow identity triplet is missing, the MD performs the step S130:4, wherein the missing triplet of identifiers of the flow is added to the correlation set of identifiers. After that the correlation set of identifiers has been added, the MD performs the step S130:5 and S140.

The step S130 could be explained by means of a short example. In case the SIP flow received for the first time is coming from EPS, the following relation active internally is stored in the MD, {[CN_def_B, IP_SIP, LIID]}<–>IMS CIN and the received flow is sent to the LEA comprising the IMS CIN. Afterwards the MD receives the "same" SIP flow from IMS identified by the triplet [CN_IMS, IP_SIP, LIID]. At this point the MD can detect that this flow is in relationship with the on received from EPS (IP_SIP and LIID are equals) and can internally add or inser the new triplet comprising the new CN_IMS in the CIN relationship:

{[CN_def_B, IP_SIP, LIID], [CN_IMS, IP_SIP, LIID]}⇔ IMS CIN

Consequently, the received flow is sent to the LEA comprising the IMS CIN as well.

Afterwards the MD received the new RTP flow from IMS identified by the triplet [CN_ded_B, IP_RTP, LIID]. At this point the MD can detect that this flow is in relationship with the ones received before (LIID are equals, CN_ded_B is linked to the CN_def_B) and can internally insert the new triplet comprising the new CN_ded_B in the CIN relationship:

{[CN_def_B, IP_SIP, LIID], [CN_IMS, IP_SIP, LIID], [CN_ded_B, IP_RTP, LIID]}⇔IMS CIN Consequently the received flow is sent to the LEA comprising the IMS CIN as well.

Figure 9:
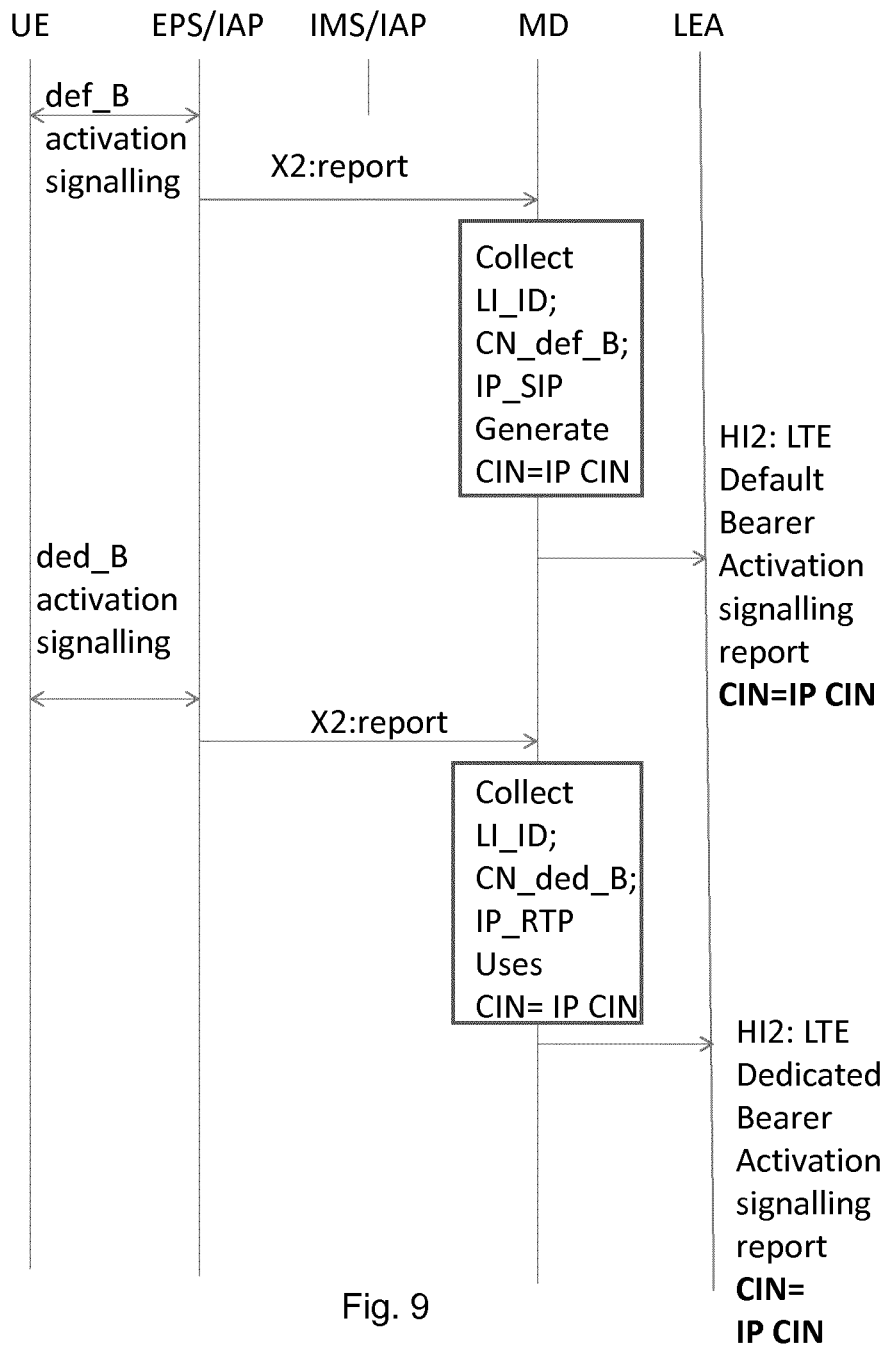
FIG. 9 is a signaling scheme illustrating a technique of collecting useful information from the data bearer set-up.

FIG. 9 is a signaling scheme illustrating a technique of collecting useful information from the data bearer set-up.

When a User Equipment, UE, of an intercepted user, i.e. a target, performs a network attach procedure towards a "well-known" APN specific for IMS network, a default Bearer, def_B, for IMS signaling is established. An Interception Access Point in the access network, EPS/IAP, intercepts this event and reports this event via an X2 interface to the Mediation Device, MD. The MD collects and stores the assigned IP user Address, IP_SIP, which is used for the IMS signaling. In addition, the MD also collects and stores the Correlation Number related to the received default Bearer Activation event, CN_def_B, linked to the IMS "well-known" APN and Lawful intercept identification, LI_ID. The succeeding intercepted data will be delivered to the MD with this CN_def_B. A first Communication Identity Number, IP CIN, is generated and reported via the HI2 interface to the LEA.

In the specific case of Voice over LTE service, a call establishment is performed by using the IMS network at the core side. At access side the IMS Signaling is sent over the default bearer, def_B and a new dedicated bearer, ded_B, linked to the default bearer, which is dynamically established for the voice traffic (i.e. RTP flows). As illustrated in the signaling scheme of FIG. 9, the MD is adapted to collect from the signaling flow sent from the access side EPS/IAP following identifiers:

LI-ID;
CN_def_B;
IP_SIP.

The MD is generating a first identifier Correlation Identifier IP CIN for the communication session. The first CIN value, IP CIN, is thereby linked to the "well-known" APN of the EPS/IAP intercepting the communication session. The default bearer activation, or establishment, event is reported via HI2 interface to LEA. The identifier IP CIN is included in the report and thereby registered by the LEA together with LI-ID.

Further, in order to transport the media flow (i.e. RTP flow) a dedicated bearer, ded_B, is established by activation signaling. This signaling is also intercepted by the same EPS/IAP having the "well-known" APN. The MD is adapted to collect from the signaling flow sent from the access side EPS/IAP following identifiers:

LI-ID;
CN_ded_B;
IP_RTP.

The dedicated bearer activation, or establishment, event is reported via the HI2 interface to LEA. The value of the CIN identifier IP CIN is included in the report and thereby registered by the LEA together with LI-ID.

As soon as the call session is established, the EPS/IAP intercepts both the IP flow and the SIP and RTP flows belonging to the established call. This Communication Content, CC, is copied and sent to the MD on X3 interface. By applying the new correlation mechanism the IP flow is reported to the LEA together with the CIN value IP CIN while the SIP and RTP flows are reported to the LEA with the same CIN value, IMS CIN, of SIP and RTP flows intercepted into IMS/IAP.

Indeed when the MD receives the X3 flows from access side, i.e. EPS/IAP, the MD has no way to distinguish IP flows from RTP and SIP flows since they are intercepted at a very "low level".

At core side, i.e. IMS, instead, the SIP and RTP flows are easily identified by the MD since the IMS/IAP send the SIP signaling flow on a X2 interface and RTP flow on a X3 interface and IMS/IAP correlates SIP and RTP with the identifier CN_IMS.

When the MD receives, from IMS/IAP, SIP events and RTP flows having the same CN_IMS, it generates a new value of the CIN, IMS CIN, to be used on HI2 and HI3 interfaces towards LEA.

The LEA uses the IMS CIN to identify the SIP signaling events and RTP flows comprising call contents belonging to same call.

Figure 10:
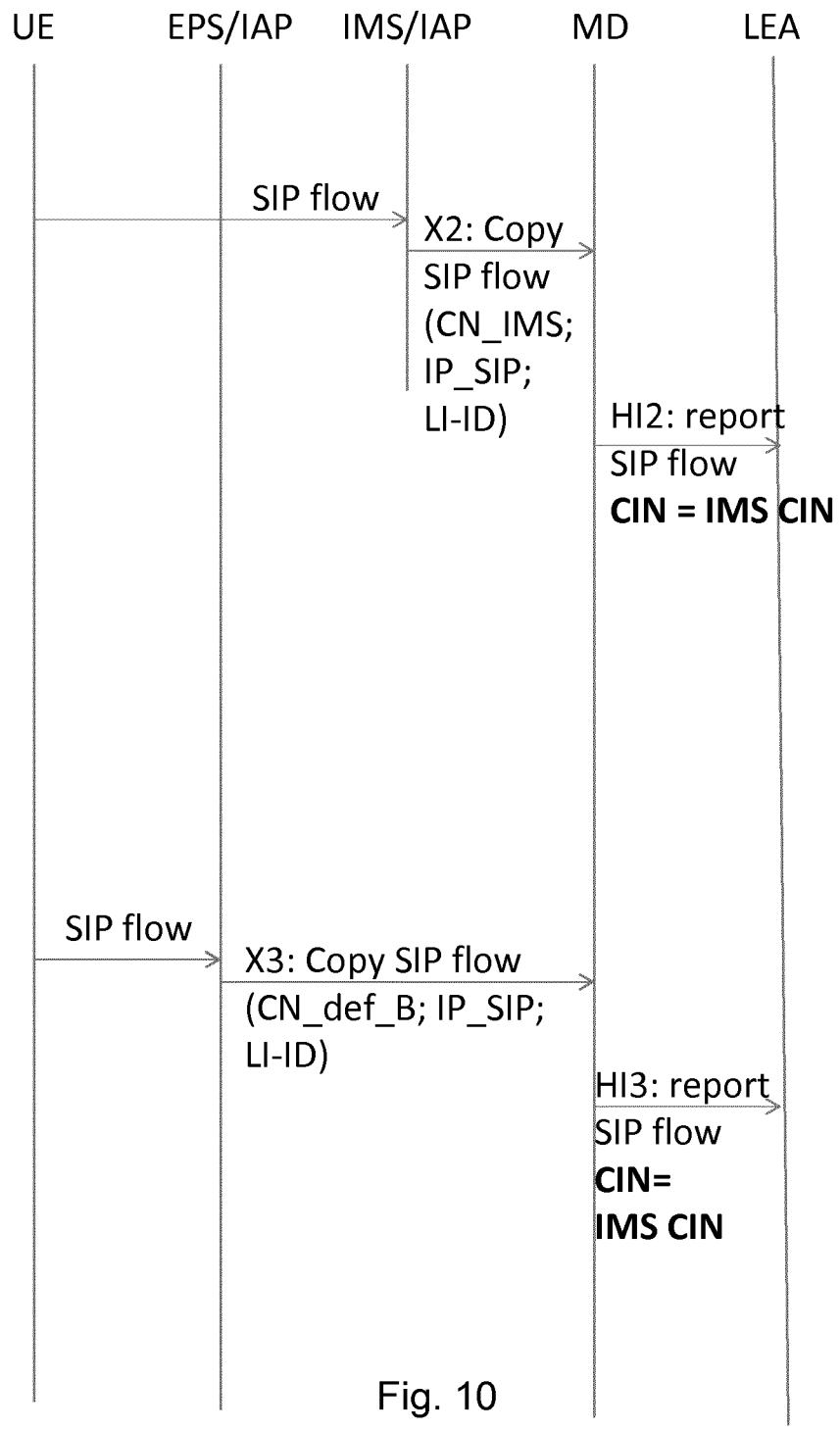
FIG. 10 is a signaling scheme illustrating how the method correlates SIP flows.
Figure 11:
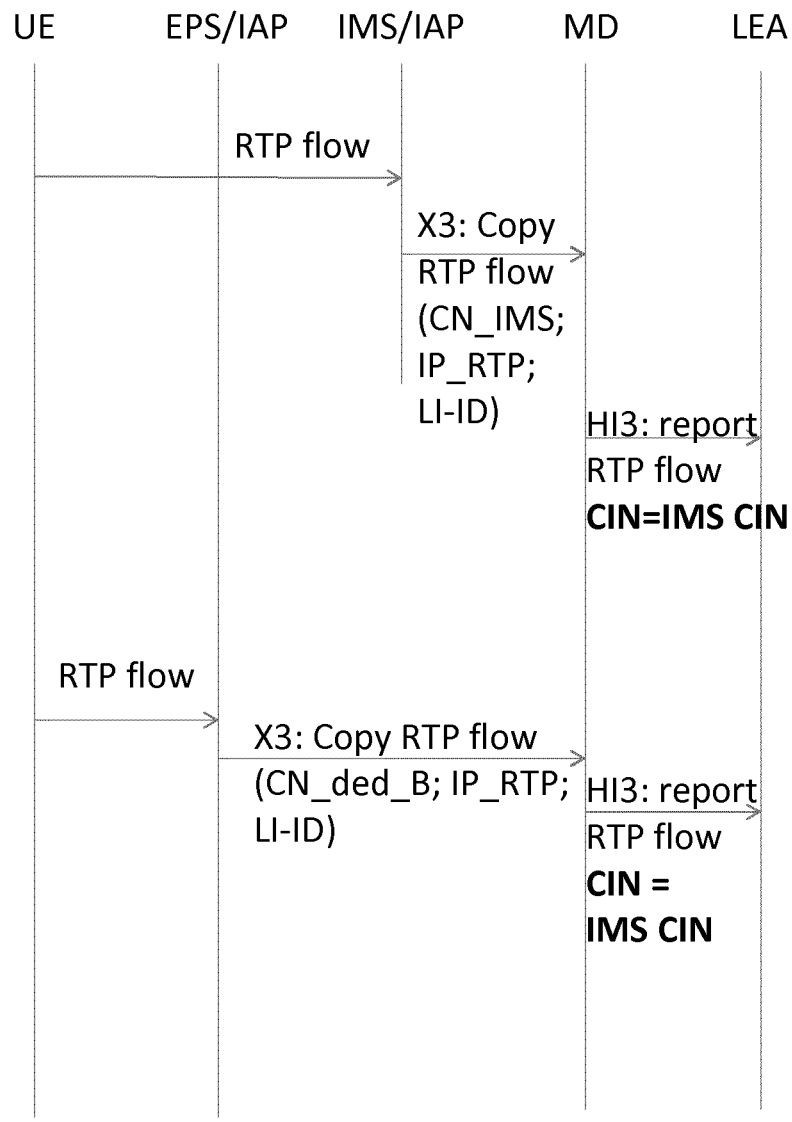
FIG. 11 is a signaling scheme illustrating the correlation mechanism adapted on RTP flows.

The mechanism for correlating SIP and RTP flows belonging to a VoLTE call intercepted both at access side with an EPS/IAP and core side with an IMS/IAP is further illustrated in FIGS. 10 and 11.

Indeed when the MD receives the X3 flows from access side, i.e. EPS/IAP, the MD has no way to distinguish IP flows from RTP and SIP flows since they are intercepted at a very "low level".

At core side, i.e. IMS, instead, the SIP and RTP flows are easily identified by the MD since the IMS/IAP send the SIP signaling flow on a X2 interface and RTP flow on a X3 interface and IMS/IAP correlates SIP and RTP with the identifier CN_IMS.

When the MD receives, from IMS/IAP, SIP events and RTP flows having the same CN_IMS, it generates a new IMS CIN to be used on HI2 and HI3 interfaces towards LEA.

The LEA uses the IMS CIN to identify the SIP signaling events and RTP flows comprising call contents belonging to same call.

FIG. 10 is a signaling scheme that illustrates how the mechanism is adapted to correlate SIP flows intercepted at access side (EPS/IAP) with SIP flows intercepted at core side (IMS/IAP).

When an IMS signaling flow is intercepted by nodes in the EPS access network and (IMS) core network, said EPS/IAP and IMS/IAP nodes deliver a copy each of the SIP flow. The SIP flow copy from the IMS/IAP comprises a triplet comprising CN_IMS, IP_SIP, and LI-ID for identifying the flow and the communication session it belongs to. On the other side, the SIP flow copy from the EPS/IAP with the proposed mechanism is identified by means of IMS "well known" APN and comprises a triplet comprising CN_def_B, IP_SIP, and LI-ID for identifying the flow and the communication session it belongs to. It is therefore understood that without the new correlation mechanism, the receiving MD or the receiving LEA could not be able to correlate the two SIP flows copies from the same original SIP flow as the triplets of the two copies are different.

When an IMS signaling is intercepted from IMS nodes, a copy of the flow is delivered from the IMS/IAP over the X2 interface to the MD. The SIP flow comprises a triplet of identifier values CN_IMS, IP_SIP, LI_ID generated by the IMS/IAP for identifying the communication session to which it belongs. The MD is able to retrieve the Correlation Number for each IMS Service session, CN_IMS, and correlate it with the identifier values of CN_def_B and CN_ded_B for the communication session, which values were collected and stored by the MD at the bearer set up (see FIG. 9). The correlation is performed using the IP_SIP and IP_RTP as well, since they are reported both in the access and in the core network. When the MD receives, from IMS/IAP, SIP events and RTP flows having the same CN_IMS, it generates a new CIN value, IMS CIN, to be used on HI2 and HI3 interfaces towards LEA. The same CIN will be used also to deliver towards the LEA the SIP and RTP flows intercepted into access side (i.e. on EPS/IAP). By summarizing the MD keeps the relationship among CN_def_B, CN_ded_B and CN_IMS to deliver SIP and RTP flows intercepted both into the access and core side with the same CIN value, i.e. IMS CIN. Said CIN allows the LEA to correlate and/or filter the redundant information coming from the access network.

As further illustrated in FIG. 10, the SIP flow is intercepted in the access network, LTE, by a EPS/IAP node. A copy of the SIP flow is delivered from the EPS/IAP over the X3 interface to the MD. The SIP flow comprises a triplet of identifier values CN_def_B, IP_SIP, LI_ID generated by the EPS/IAP for identifying the communication session to which it belongs. The MD identifies the Correlation Number for the IMS Service session, CN_IMS, and correlates it with the identifier values of CN_def_B and CN_ded_B for the communication session, which values were collected and stored by the MD at the PDP context/Bearer set up. The MD retrieves the generated IMS CIN for SIP events and RTP flows having the same CN_IMS, and uses said IMS CIN on HI2 and HI3 interfaces towards LEA. The IMS CIN is used at same time also to report to the LEA via the HI3 interface the SIP flows intercepted at access side. The same CIN value for access and core side allows the LEA to correlate and/or filter the redundant information coming from the access network.

FIG. 11 is a signaling scheme illustrating the correlation mechanism adapted on RTP flows in LI system.

When an IMS call flow is intercepted by nodes in the (LTE) access network and (IMS) core network, said EPS/IAP and IMS/IAP nodes deliver a copy each of the original RTP flow. The RTP flow copy from the IMS/IAP comprises a triplet comprising CN_IMS, IP_RTP, and LI-ID for identifying the flow and the communication session it belongs to. On the other side, the RTP flow copy from the EPS/IAP comprises a triplet comprising CN_ded_B, IP_RTP, and LI-ID for identifying the flow and the communication session it belongs to. It is therefore understood that without the correlation mechanism, the receiving MD or the receiving LEA could not be able to correlate the two RTP flows copies from the same original RTP flow as the triplets of the two copies are different.

When an IMS call is intercepted from IMS nodes, IMS/IAP, a copy of the RTP flow comprising call content is delivered from the IMS/IAP over the X3 interface to the MD. The RTP flow comprises a triplet of identifier values CN_IMS, IP_RTP, LI_ID generated by the IMS/IAP for identifying the communication session to which the flow belongs. The MD is able to retrieve the Correlation Number for each IMS Service session, CN_IMS, and correlate it with the identifier values of CN_def_B and CN_ded_B for the communication session, which values were collected and stored by the MD at the communication session set up (see FIG. 1). When the MD receives the RTP flow from IMS/IAP, the MD checks the received CN_IMS for stored corresponding IMS CIN. For a RTP flow having matching CN_IMS, the MD inserts the identifiers IMS CIN. The MD then reports the received RTP flow to the LEA.

In FIG. 11 it is further illustrated the RTP flow being intercepted in the access network, LTE, by a EPS/IAP node. A copy of the RTP flow is delivered from the EPS/IAP over the X3 interface to the MD. The RTP flow comprises a triplet of identifier values CN_ded_B, IP_RTP, LI_ID generated by the LTE/IAP for identifying the communication session to which it belongs. The MD identifies the Correlation Number for the dedicated Bearer of the IMS Service session, CN_ded_B, and correlates it with the identifier values of CN_IMS and CN_def_B for the communication session, which values were collected and stored by the MD at the PDP context/Bearer set up (see FIG. 9). The MD retrieves the generated IMS CIN for SIP events and RTP flows having the same CN_IMS, and uses said IMS CIN on HI2 and HI3 interfaces towards LEA.

The IMS CIN is used at same time also to report to the LEA via the HI3 interface the RTP flows intercepted at access side. The same CIN (i.e. B) for access and core side allows the LEA to correlate and/or filter the redundant information coming from the access network.

Figure 12:
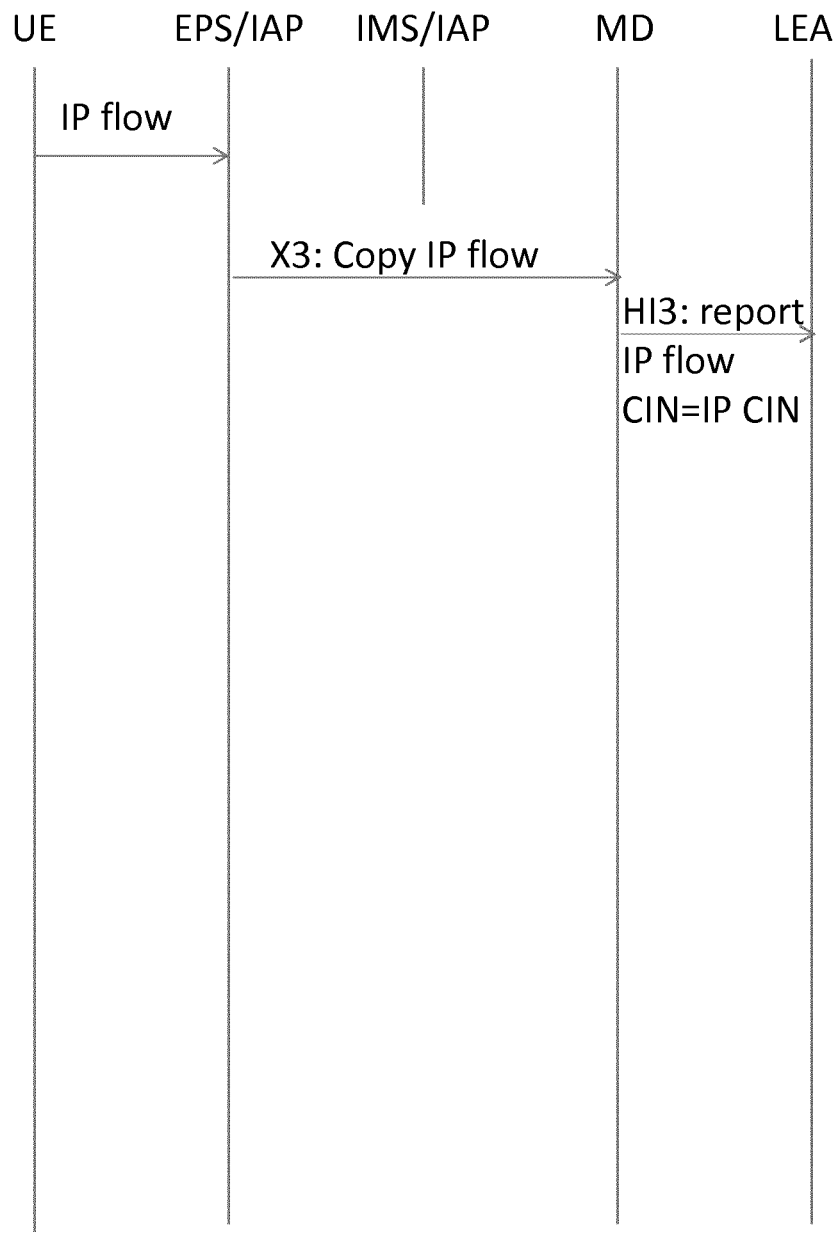
FIG. 12 is a signaling scheme illustrating the handling of IP flows.

FIG. 12 is a signaling scheme illustrating the handling of IP flows in LI systems according to the mechanism.

A default bearer or PDP context activation, or establishment, causes the MD to generate a Communication identifier number CIN=IP CIN for the communication session. The value IP CIN, in case of intercepted IP flow, is linked to the APN associated to a UE connected to the LTE/IAP node intercepting the communication session. Thus, when an IP flow passes the EPS/IAP, the IP flow is intercepted and a copy of the IP flow is generated and delivered to the MD. The MD inserts the IP CIN and reports the IP flow comprising the Correlation identifier IP CIN to the LEA.

As could be understood by a skilled person in the art by the above description of the correlation mechanism, the correlation mechanism does not only correlate a SIP flow copy from the LTE access network to a SIP flow copy from the IMS core network, and a RTP flow copy from the LTE access network to a RTP flow copy from the IMS core network, said correlation mechanism also correlates all SIP and RTP flow copies from the same IMS service and communication session, due to the fact that the correlation mechanism in the MD gives SIP and RTP flow copies from the same IMS service and communication session the same identifier triplet CN_def_B, CN_ded_B and CN_IMS.

Further, the LEA is able to distinguish SIP and RTP flows from IP flows as the SIP and RTP flows are given another Correlation Identifier value IMS CIN which is different from the first Correlation Identifier value IP CIN used for identifying IP flows.

Given these assumptions all kind of IMS service sessions coming from both domains, LTE and IMS, can be correlated and eventually filtered out by the LEA.

Figure 13:
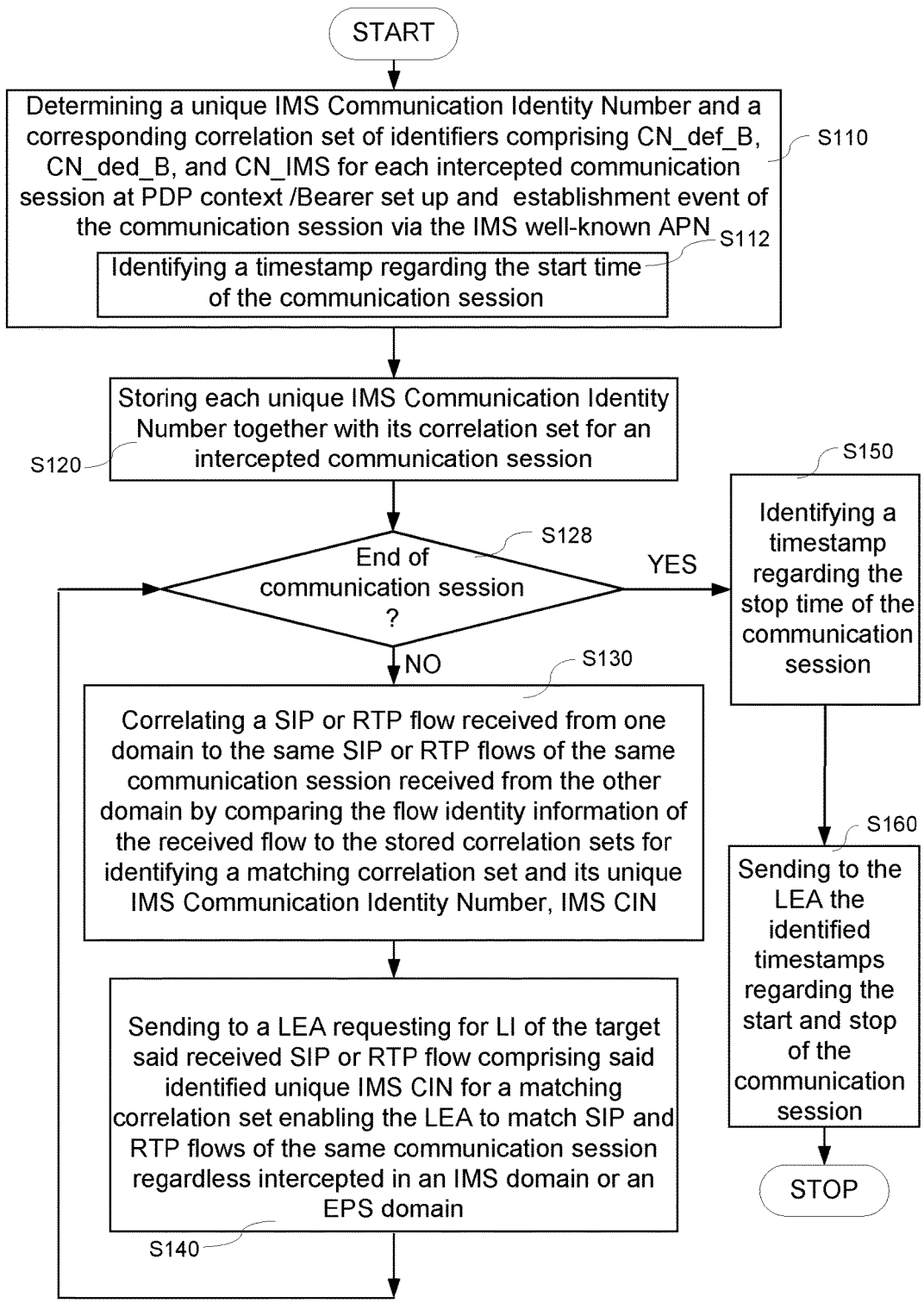
FIG. 13 is a flowchart illustrating an embodiment of the method.

FIG. 13 is a flowchart illustrating an embodiment of the method for detecting and correlating SIP and RTP flows comprising identical content belonging to a communication session of a target.

In this embodiment, the start and end of the communication session are registered by the MD 100, The timestamps regarding the start and end of the communication session are identified in the SIP signaling of the communication session start and end.

Thus, step S110 may involve the step S112:
Identifying a timestamp regarding the start time of the communication session.

Further, the embodiment comprises after S128, when the criterion "End of communication session" is fulfilled, a step S150:
Identifying a timestamp regarding the stop time of the communication session; and a step S160:
Sending to the LEA the identified timestamps regarding the start and stop of a communication session.

Thus, the MD 100 is adapted to generate a report and send said report comprising timestamps regarding the start and end time of the communication session to a requesting LEA.

The method and embodiments thereof may be implemented in digital electronically circuitry, or in computer hardware, firmware, software, or in combinations of them.

Apparatus of the technique may be implemented in a computer program product tangibly embodied in a machine readable storage device for execution by a programmable processor; and method steps of the technique may be performed by a programmable processor executing a program of instructions to perform functions of the method by operating on input data and generating output.

The method may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Generally, a programmable processor will receive instructions and data from a read-only memory and/or a random access memory. Storage devices suitable for tangibly embodying computer program instructions and data include all forms of non-volatile memory, including by way of example semiconductor memory devices, such as EPROM (erasable programmable read only memory), EEPROM (electrically erasable programmable read only memory), and flash memory devices; magnetic disks such internal hard disks and removable disks; magneto-optical disks; and CD-ROM (Compact Disc Read-Only Memory) disks. Any of the foregoing may be supplemented by, or incorporated in, specially designed ASICs (Application Specific Integrated Circuits).

Figure 14:
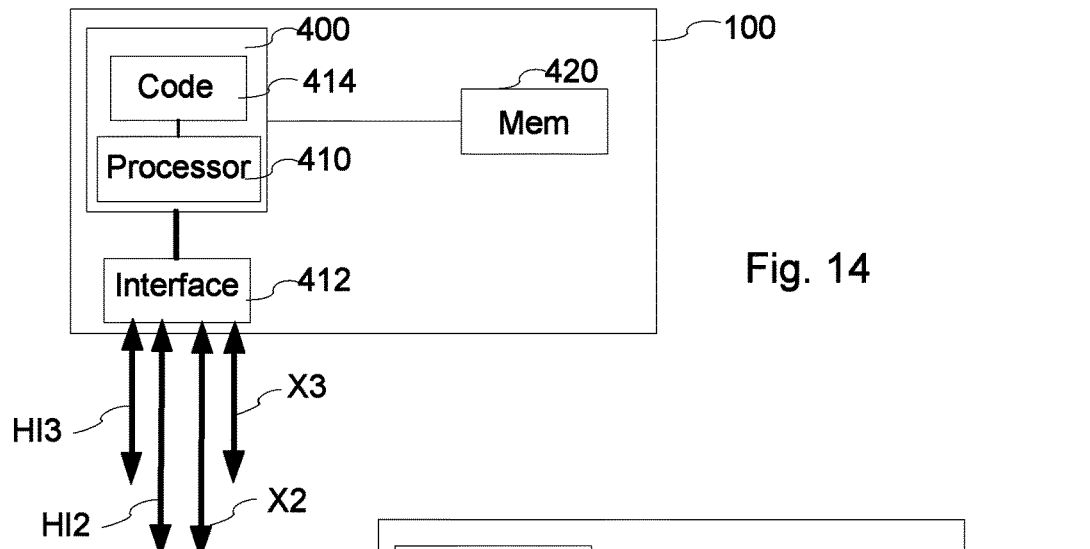
FIG. 14 is a block diagram illustrating a mediation device wherein the method is implemented.
Figure 15:
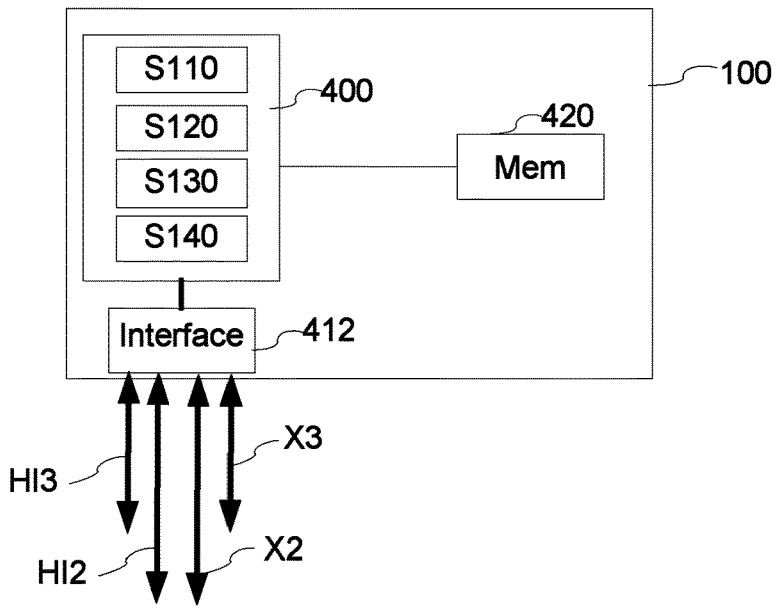
FIG. 15 is a block diagram illustrating an embodiment of the mediation device.
Figure 16:
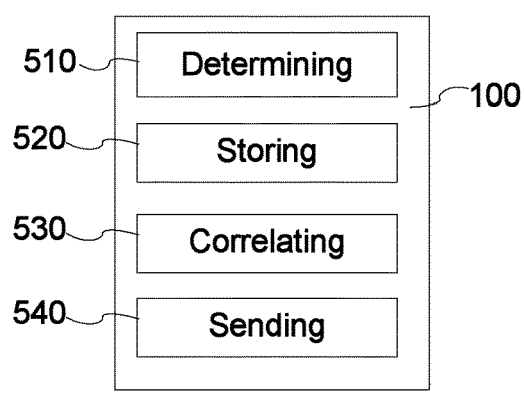
FIG. 16 is a block diagram illustrating further one embodiment of the mediation device.

Various embodiments of a mediation device are illustrated in FIGS. 14, 15 and 16. The MD comprises a processor circuitry being adapted to control a mediation function, both MF2 and MF3.

FIG. 14 is a block diagram illustrating one implementation of a mediation device.

The MD comprises a processing circuitry 400, which comprises a processor 410 and a memory storage 414 for storing computer program instructions as code and data for enabling the processing of the incoming data. Said processing circuitry 400 may also be used for implementing a Delivery Function DF2 and DF3. The processor 410 will receive instructions and data from the memory storage 414 implemented by a read-only memory and/or a random access memory. Storage devices suitable for tangibly embodying computer program instructions and data include all forms of non-volatile memory. Further, a memory storage 420, e.g. a Cache memory, is connected to the processing circuitry 400 for storing each unique CIN values together with its correlation set for an intercepted communication session.

The processing circuitry 400 is capable of communicating with LEAs via interface 412, which is adapted to communicate with IAPs via interfaces X2 and X3, and with the LEAs via interfaces HI2 and HI3. The processor 410 is preferably a programmable processor.

The mediation device comprises a processing circuitry 400, which is adapted to operatively perform the steps of:
Determining a unique IMS Communication Identity Number, IMS CIN, and a corresponding correlation set of identifiers comprising CN_def_B, CN_ded_B, and CN_IMS for each intercepted communication session at PDP context/Bearer set up and establishment event of the communication session via the IMS well-known APN;

Storing each unique IMS CIN together with its correlation set for an intercepted communication session;

Correlating a SIP or RTP flow received from one domain to the same SIP or RTP flows of the same communication session received from the other domain by comparing the flow identity information of the received flow to the stored correlation sets for identifying a matching correlation set and its unique IMS CIN;

Sending to a LEA requesting for LI of the target said received SIP or RTP flow comprising said identified unique IMS CIN for a matching correlation set enabling the LEA to match SIP and RTP flows of the same communication session regardless intercepted in an IMS domain or an EPS domain.

The processing circuitry 400 may in some embodiments be adapted to operatively perform the steps of:

receiving a default Bearer activation signalling from the EPS/IAP;

collecting identifiers LI-ID, CN_def_B and IP_SIP constituting a first triplet of flow identity information from said default Bearer activation signalling;

storing the identifiers LI-ID, CN_def_B and IP_SIP as identifiers in a correlation set for said communication session;

generating an IP Communication Identity Number, IP CIN, for said communication session;

sending a report of the Default Bearer Activation signaling comprising said IP Communication Identity Number IP CIN over HI2 to a LEA requesting for LI of the target.

According to further embodiments, the processing circuitry 400 may be adapted to operatively perform the steps of:

receiving a dedicated Bearer activation signalling from the EPS/IAP;

collecting identifiers LI-ID, CN_ded_B and IP_RTP constituting a second triplet from said dedicated Bearer activation signalling;

comparing LI-ID of the second triplet with LI-ID in stored first triplet;

storing the identifiers LI-ID, CN_ded_B and IP_RTP as identifiers in the correlation set for said communication session, if the received LI-ID matches stored identifiers LI-ID in the first triplet;

sending a report of the Dedicated Bearer Activation signaling comprising the IP CIN over HI2 to a LEA requesting for LI of the target.

The processing circuitry 400 may in further embodiments be adapted to operatively perform the steps of:

Comparing the flow identity information of the received flow to the stored correlation sets for identifying a matching correlation set and its unique IMS CIN;

Inserting the unique IMS CIN of a matching correlation set into a generated report of the received flow to be sent to the requesting LEA.

The processing circuitry 400 may further be adapted to operatively perform the step of:

Identifying a matching correlation set comprising flow identity information of identifiers of the received flow;

Detecting if the triplet of identifiers is missing in the correlation set of the communication session;

Inserting the missing triplet of identifiers of the flow into the correlation set of identifiers.

The processing circuitry 400 may further be adapted to operatively perform the step of:

Identifying a timestamp regarding the start time of the communication session;

Identifying a timestamp regarding the stop time of the communication session; and Sending to the LEA the identified timestamps regarding the start and stop of a communication session.

FIG. 15 is a block diagram illustrating one implementation of a mediation device.

The mediation device comprises a processing circuitry 400, which comprises a processor 410 and a memory storage 414 for storing computer program instructions as code and data for enabling the processing of the incoming data. Said processing circuitry 400 may also be used for implementing a Delivery Functions DF2 and DF3. The processor 410 will receive instructions and data from the memory storage 414 implemented by a read-only memory and/or a random access memory. Storage devices suitable for tangibly embodying computer program instructions and data include all forms of non-volatile memory. Further, a memory storage 420, e.g. a Cache memory, is connected to the processing circuitry 400 for storing each unique IMS CIN together with its correlation set for an intercepted communication session.

The processing circuitry 400 is capable of communicating with LEAs via interface 412, which is adapted to communicate with IAPs via interfaces X2 and X3 and with the LEAs via interfaces HI" and HI3. The processor 410 is preferably a programmable processor. The mediation device 100 comprises a processing circuitry 400, which is adapted to operatively perform the steps of:

S110:—Determining a unique IMS Communication Identity Number, IMS CIN, and a corresponding correlation set of identifiers comprising CN_def_B, CN_ded_B, and CN_IMS for each intercepted communication session at PDP context/Bearer set up and establishment event of the communication session via the IMS well-known APN;

S120:—Storing each unique IMS CIN together with its correlation set for an intercepted communication session;

S130:—Correlating a SIP or RTP flow received from one domain to the same SIP or RTP flows of the same communication session received from the other domain by comparing the flow identity information of the received flow to the stored correlation sets for identifying a matching correlation set and its unique IMS CIN;

S140:—Sending to a LEA requesting for LI of the target said received SIP or RTP flow comprising said identified unique IMS CIN for a matching correlation set enabling the LEA to match SIP and RTP flows of the same communication session regardless intercepted in an IMS domain or an EPS domain.

The processing circuitry 400 may in some embodiments be adapted to operatively perform the steps of:

S110:1:—Receiving a default Bearer activation signalling from the EPS/IAP;

S110:2:—Collecting identifiers LI-ID, CN_def_B and IP_SIP constituting a first triplet of flow identity information from said default Bearer activation signalling;

S110:3:—Storing the identifiers LI-ID, CN_def_B and IP_SIP as identifiers in a correlation set for said communication session.

S110:4:—Generating an IP Communication Identity Number, IP CIN, for said communication session; and S110:5:—Sending a report of the Default Bearer Activation signaling comprising said IP Communication Identity Number IP CIN over HI2 to a LEA requesting for LI of the target.

According to further embodiments, the processing circuitry 400 may be adapted to operatively perform the steps of:

S110:6:—receiving a dedicated Bearer activation signalling from the EPS/IAP;

S110:7:—Collecting identifiers LI-ID, CN_ded_B and IP_RTP constituting a second triplet from said dedicated Bearer activation signalling;

S110:8:—Comparing LI-ID of the second triplet with LI-ID in stored first triplet;

S110:9:—Storing the identifiers LI-ID, CN_ded_B and IP_RTP as identifiers in the correlation set for said communication session, if the received LI-ID matches stored identifiers LI-ID in the first triplet;

S110:10:—Sending a report of the Dedicated Bearer Activation signaling comprising the IP CIN over HI2 to a LEA requesting for LI of the target.

The processing circuitry 400 may in further embodiments be adapted to operatively perform the steps of:

S110:11:—Receiving a SIP flow for the first time after the communication session establishment event is finalised;

S110:12:—Collecting identifiers LI-ID, CN_IMS, IP_SIP constituting a third triplet from said SIP flow;

S110:13:—Comparing LI-ID and IP_SIP of the third triplet with LI-ID and IP_SIP in stored first triplet;

S110:14:—Storing the identifiers LI-ID, CN_IMS and IP_SIP as identifiers in the correlation set for said communication session, if the comparison result is a match of LI-ID and IP_SIP with corresponding identifiers in the first triplet;

S110:15:—Generating a unique IMS Communication Identity Number, IMS CIN, for identifying the correlation set of identifiers comprising CN_def_B, CN_ded_B, and CN_IMS of the communication session.

The processing circuitry 400 may further be adapted to operatively perform the step of:

S130:1:—Comparing the flow identity information of the received flow to the stored correlation sets for identifying a matching correlation set and its unique IMS CIN; and S130:5:—Inserting the unique IMS CIN of a matching correlation set into a generated report of the received flow to be sent to the requesting LEA.

The processing circuitry 400 may further be adapted to operatively perform the step of:

S130:2:—Identifying a matching correlation set comprising flow identity information of identifiers of the received flow;

S130:3:—Detecting if the triplet of identifiers is missing in the correlation set of the communication session; and S130:4:—Inserting the missing triplet of identifiers of the flow into the correlation set of identifiers.

The processing circuitry 400 may further be adapted to operatively perform the step of:

S112:—Identifying a timestamp regarding the start time of the communication session;

S150:—Identifying a timestamp regarding the stop time of the communication session; and S160:—Sending to the LEA the identified timestamps regarding the start and stop of a communication session.

FIG. 16 is a block diagram illustrating another implementation of a mediation device 100.

Said mediation device enables detecting and correlating copies of Session Initiation Protocol, SIP, and Real-time Transport Protocol, RTP, flows, respectively, belonging to a communication session of an intercepted user, a target. Said session is established via an IP Multimedia subsystem, IMS, having a well-known Access Point Name, APN, which session is intercepted in an IMS domain by an Interception Access Point, IMS/IAP, and in an Evolved Packet System, EPS domain, by an Interception Access Point EPS/IAP. The interceptions result in the generation of copies of the session's SIP and RTP flows comprising flow identity information defined by a set of identifiers, triplet, comprising LI-ID and one of IP_SIP or IP_RTP of the target, and identical content. Said copies of SIP and RTP flows is received by the mediation device.

According to this embodiment, the mediation device 100 comprises means for determining or a determining module 510 that is adapted to determine a unique IMS Communication Identity Number, IMS CIN, and a corresponding correlation set of identifiers comprising correlation number of a default bearer, CN_def_B, correlation number of a dedicated bearer, CN_ded_B, and correlation number of the IMS, CN_IMS, for each intercepted communication session at PDP context/Bearer set up and establishment event of the communication session via the IMS well-known APN;

means for storing or a storing module 520 that is adapted to store each unique IMS CIN together with its correlation set for an intercepted communication session;

means for correlating or a correlating module 530 that is adapted to correlate a SIP or RTP flow received from one domain to the same SIP or RTP flows of the same communication session received from the other domain by comparing the flow identity information of the received flow to the stored correlation sets for identifying a matching correlation set and its unique IMS CIN; and sender means or a sender module 540 that is adapted to send to a LEA requesting for LI of the target said received SIP or RTP flow comprising said identified unique IMS CIN for a matching correlation set enabling the LEA to match SIP and RTP flows of the same communication session regardless intercepted in an IMS domain or an EPS domain.

The mediation device 100 is capable by said means or modules to support the method S100 and its embodiments.

According to various embodiments, the means for determining or the determining module 510 may be adapted to receive a default Bearer activation signalling from the EPS/IAP, collect identifiers LI-ID, CN_def_B and IP_SIP constituting a first triplet of flow identity information from said default Bearer activation signalling, store the identifiers LI-ID, CN_def_B and IP_SIP as identifiers in a correlation set for said communication session, generate an IP Communication Identity Number, IP CIN, for said communication session, and to send by means of the sending module 540 a report of the Default Bearer Activation signaling comprising said IP Communication Identity Number IP CIN over HI2 to a LEA requesting for LI of the target.

According to various embodiments, the means for determining or the determining module 510 may be adapted to receive a dedicated Bearer activation signalling from the EPS/IAP, collect identifiers LI-ID, CN_ded_B and IP_RTP constituting a second triplet from said dedicated Bearer activation signalling, compare LI-ID of the second triplet with LI-ID in stored first triplet, store the identifiers LI-ID, CN_ded_B and IP_RTP as identifiers in the correlation set for said communication session, if the received LI-ID matches stored identifiers LI-ID in the first triplet, and to send by means of the sending module 540 a report of the Dedicated Bearer Activation signaling comprising the IP CIN over HI2 to a LEA requesting for LI of the target.

According to further various embodiments, the means for determining or the determining module 510 may be adapted to receive a SIP flow for the first time after the communication session establishment event is finalised, collect identifiers LI-ID, CN_IMS, IP_SIP constituting a third triplet from said SIP flow, compare LI-ID and IP_SIP of the third triplet with LI-ID and IP_SIP in stored first triplet, store the identifiers LI-ID, CN_IMS and IP_SIP as identifiers in the correlation set for said communication session, if the comparison result is a match of LI-ID and IP_SIP with corresponding identifiers in the first triplet, and to generate a unique IMS Communication Identity Number, IMS CIN, for identifying the correlation set of identifiers comprising CN_def_B, CN_ded_B, and CN_IMS of the communication session.

According to further various embodiments, the means for correlating or the correlating module 530 may be adapted to compare the flow identity information of the received flow to the stored correlation sets for identifying a matching correlation set and its unique IMS CIN, to insert the unique IMS CIN of a matching correlation set into a generated report of the received flow to be sent to the requesting LEA.

The means for correlating or the correlating module 530 may be adapted to identify a matching correlation set comprising flow identity information of identifiers of the received flow, detect if the triplet of identifiers is missing in the correlation set of the communication session, and to insert the missing triplet of identifiers of the flow into the correlation set of identifiers.

According to various embodiments, the means for determining or the determining module 510 may be adapted to identify a timestamp regarding the start time of the communication session, and to identify a timestamp regarding the stop time of the communication session.

According to further various embodiments, the sender means or the sender module 540 that is adapted to send to the LEA the identified timestamps regarding the start and stop of a communication session.

It is also provided a computer program comprising computer program code which, when run in a processing circuitry 400 of a MD 100 causes the system to perform the steps of the method S100 and its embodiments which are described above in connection to FIGS. 4 to 8.

It is also provided a computer program product comprising a computer program and a computer readable means on which the computer program is stored.

It is further provided a carrier containing the computer program, wherein the carrier is one of an electronic signal, optical signal, radio signal or computer readable storage medium.

A number of embodiments of the present technique have been described. It will be understood that various modifications may be made without departing from the scope of the technique. Therefore, other implementations are within the scope of the following claims.

The invention claimed is:

1. A method for detecting and correlating copies of Session Initiation Protocol (SIP) and Real-time Transport Protocol (RTP) flows, respectively, belonging to a communication session of an intercepted user (a target) the session being established via an Internet protocol Multimedia Subsystem (IMS) having a well-known Access Point Name (APN), which session is intercepted in an IMS domain by an Interception Access Point (IMS/IAP), and in an Evolved Packet System (EPSP) domain by an Interception Access Point (EPS/IAP), by which interception result in the generation of copies of the session's SIP and RTP flows comprising flow identity information defined by a set of identifiers (triplet) comprising Lawful Interception Identity (LI-ID) and one of assigned IP user addresses IP_SIP or IP_RTP of the target, and identical content, the copies of SIP and RTP flows being received by a mediation function of a Lawful Interception (LI) system, the method comprising:
determining a unique IMS Communication Identity Number (IMS CIN) and a corresponding correlation set of identifiers comprising Correlation Number of default Bearer (CN_def_B), Correlation Number of dedicated Bearer (CN_ded_B) and IMS Correlation Number (CN_IMS) for each intercepted communication session at Packet Data Protocol (PDP) context/Bearer set up and establishment event of the communication session via the IMS well-known APN;
storing each unique IMS CIN together with its correlation set for an intercepted communication session;
correlating a SIP or RTP flow received from one domain to the same SIP or RTP flows of the same communication session received from the other domain by comparing the flow identity information of the received flow to the stored correlation sets for identifying a matching correlation set and its unique IMS CIN;
sending, to a Law Enforcement Agency (LEA) requesting for LI of the target, the received SIP or RTP flow comprising the identified unique IMS CIN for a matching correlation set, enabling the LEA to match SIP and RTP flows of the same communication session regardless of whether intercepted in an IMS domain or an EPS domain.

2. The method of claim 1, wherein the method comprises, at the PDP context/Bearer set up and communication session establishment event of a target:
receiving a default Bearer activation signaling from the EPS/IAP;
collecting identifiers LI-ID, CN_def_B, and IP_SIP constituting a first triplet of flow identity information from the default Bearer activation signaling;
storing the identifiers LI-ID, CN_def_B, and IP_SIP as identifiers in a correlation set for the communication session;
generating an IP Communication Identity Number (IP CIN) for the communication session;
sending a report of the Default Bearer Activation signaling comprising the IP CIN over HI2 to a LEA requesting for LI of the target.

3. The method of claim 2, wherein the method comprises, at the PDP context/Bearer set up and communication session establishment event of a target:
receiving a dedicated Bearer activation signaling from the EPS/IAP;
collecting identifiers LI-ID, CN_ded_B, and IP_RTP constituting a second triplet from the dedicated Bearer activation signaling;
comparing LI-ID of the second triplet with LI-ID the stored first triplet;
storing the identifiers LI-ID, CN_ded_B, and IP_RTP as identifiers in the correlation set for the communication session, if the received LI-ID matches stored identifiers LI-ID in the first triplet;
sending a report of the Dedicated Bearer Activation signaling comprising the IP CIN over HI2 to a LEA requesting for LI of the target.

4. The method of claim 3, wherein the determining comprises:
receiving a SIP flow for the first time after the communication session establishment event is finalized;
collecting identifiers LI-ID, CN_IMS, IP_SIP constituting a third triplet from the SIP flow;
comparing LI-ID and IP_SIP of the third triplet with LI-ID and IP_SIP of the stored first triplet;
storing the identifiers LI-ID, CN_IMS, and IP_SIP as identifiers in the correlation set for the communication session, if the comparison result is a match of LI-ID and IP_SIP with corresponding identifiers in the first triplet;

generating a unique IMS Communication Identity Number (IMS CIN) for identifying the correlation set of identifiers comprising CN_def_B, CN_ded_B, and CN_IMS of the communication session.

5. The method of claim 1, wherein the correlating comprises:

comparing the flow identity information of the received flow to the stored correlation sets for identifying a matching correlation set and its unique IMS CIN;

identifying a matching correlation set comprising flow identity information of identifiers of the received flow;

inserting the unique IMS Communication Identity Number (IMS CIN) of a matching correlation set into a generated report of the received flow to be sent to the requesting LEA.

6. The method of claim 5, wherein the correlating further comprises:

detecting if the triplet of identifiers is missing in the correlation set of the communication session;

inserting the missing triplet of identifiers of the flow into the correlation set of identifiers.

7. The method of claim 1, wherein a complete correlation set comprises values of the identifiers CN_def_B, CN_ded_B, CN_IMS, IP_SIP, IP_RTP, and LI-ID.

8. The method of claim 7, wherein the identifiers are constituting triplets of three identifiers, each triplet enabling identification whether the received flow is received from an EPS/IAP or IMS/IAP.

9. The method of claim 1, wherein the identifier values of IP_SIP and IP_RTP both are the IP address of the assigned user, and the values are equal for a communication session.

10. The method of claim 9, further comprising:

identifying a timestamp regarding a start time of the communication session; and identifying a timestamp regarding a stop time of the communication session.

11. The method according to claim 10, further comprising sending, to the LEA, the identified timestamps regarding the start and stop of a communication session.

12. A mediation device in a Lawful Interception (LI) system for detecting and correlating copies of Session Initiation Protocol (SIP) and Real-time Transport Protocol (RTP) flows, respectively, belonging to a communication session of an intercepted user (a target), the session being established via an Internet Protocol Multimedia subsystem (IMS) having a well-known Access Point Name (APN), which session is intercepted in an IMS domain by an Interception Access Point (IMS/IAP) and in an Evolved Packet System (EPS) domain by an Interception Access Point (EPS/IAP), by which interception result in the generation of copies of the session's SIP and RTP flows comprising flow identity information defined by a set of identifiers (triplet) comprising Lawful Interception Identity, (LI-ID), and one of assigned IP user addresses IP_SIP or IP_RTP of the target, and identical content, the copies of SIP and RTP flows being received by the mediation device of a LI system, wherein the mediation device comprises:

processing circuitry;

memory containing instructions executable by the processing circuitry whereby the mediation device is operative to:

determine a unique IMS Communication Identity Number (IMS CIN) and a corresponding correlation set of identifiers comprising Correlation Number of default Bearer (CN_def_B), Correlation Number of dedicated Bearer (CN_ded_B), and IMS Correlation Number (CN_IMS) for each intercepted communication session at Packet Data Protocol (PDP) context/Bearer set up and establishment event of the communication session via the IMS well-known APN;

store each unique IMS CIN together with its correlation set for an intercepted communication session;

correlate a SIP or RTP flow received from one domain to the same SIP or RTP flows of the same communication session received from the other domain by comparing the flow identity information of the received flow to the stored correlation sets for identifying a matching correlation set and its unique IMS CIN; and sending to a Law Enforcement Agency (LEA) requesting for LI of the target, the received SIP or RTP flow comprising the identified unique IMS CIN for a matching correlation set enabling the LEA to match SIP and RTP flows of the same communication session regardless of whether intercepted in an IMS domain or an EPS domain.

13. The mediation device of claim 12, wherein the instructions are such that the mediation device is operative to, at the PDP context/Bearer set up and communication session establishment event of a target:

receive a default Bearer activation signaling from the EPS/IAP;

collect identifiers LI-ID, CN_def_B, and IP_SIP constituting a first triplet of flow identity information from the default Bearer activation signaling;

store the identifiers LI-ID, CN_def_B, and IP_SIP as identifiers in a correlation set for the communication session;

generate an IP Communication Identity Number (IP CIN) for the communication session;

send a report of the Default Bearer Activation signaling comprising the IP CIN over HI2 to a LEA requesting for LI of the target.

14. The mediation device of claim 13, wherein the instructions are such that the mediation device is operative to, at the PDP context/Bearer set up and communication session establishment event of a target:

receive a dedicated Bearer activation signaling from the EPS/IAP;

collect identifiers LI-ID, CN_ded_B, and IP_RTP constituting a second triplet from the dedicated Bearer activation signaling;

compare LI-ID of the second triplet with LI-ID in the stored first triplet;

store the identifiers LI-ID, CN_ded_B, and IP_RTP as identifiers in the correlation set for the communication session, if the received LI-ID matches stored identifiers LI-ID in the first triplet;

send a report of the Dedicated Bearer Activation signaling comprising the IP CIN over HI2 to a LEA requesting for LI of the target.

15. The mediation device of claim 14, wherein the instructions are such that the mediation device is operative to:

receive a SIP flow for the first time after the communication session establishment event is finalized;

collect identifiers LI-ID, CN_IMS, IP_SIP constituting a third triplet from the SIP flow;

compare LI-ID and IP_SIP of the third triplet with LI-ID and IP_SIP in the stored first triplet;

store the identifiers LI-ID, CN_IMS, and IP_SIP as identifiers in the correlation set for the communication session, if the comparison result is a match of LI-ID and IP_SIP with corresponding identifiers in the first triplet;

generate a unique IMS CIN for identifying the correlation set of identifiers comprising CN_def_B, CN_ded_B, and CN_IMS of the communication session.

16. The mediation device of claim 12, wherein the instructions are such that the mediation device is operative to:

compare the flow identity information of the received flow to the stored correlation sets for identifying a matching correlation set and its unique IMS CIN;

Identify a matching correlation set comprising flow identity information of identifiers of the received flow;

Insert the unique IMS CIN of a matching correlation set into a generated report of the received flow to be sent to the requesting LEA.

17. The mediation device of claim 16, wherein the instructions are such that the mediation device is operative to:

detect if the triplet of identifiers is missing in the correlation set of the communication session;

insert the missing triplet of identifiers of the flow into the correlation set of identifiers.

18. The mediation device of claim 12, wherein a complete correlation set comprises values of the identifiers CN_def_B, CN_ded_B, CN_IMS, IP_SIP, IP_RTP, and LI-ID.

19. The mediation device of claim 18, wherein the identifiers are constituting triplets of three identifiers, each triplet enabling identification whether the received flow is received from an EPS/IAP or IMS/IAP.

20. The mediation device of claim 12, wherein the identifier values of IP_SIP and IP_RTP both are the IP address of the assigned user, and the values are equal for a communication session.

21. The mediation device of claim 12, wherein the instructions are such that the mediation device is operative to:

identify a timestamp regarding the start time of the communication session; and identify a timestamp regarding the stop time of the communication session.

22. The mediation device of claim 21, wherein the instructions are such that the mediation device is operative to send, to the LEA, the identified timestamps regarding the start and stop of a communication session.

23. A non-transitory computer readable recording medium storing a computer program product for controlling a mediation device for detecting and correlating copies of Session Initiation Protocol (SIP) and Real-time Transport Protocol (RTP) flows, respectively, belonging to a communication session of an intercepted user (a target) the session being established via an Internet protocol Multimedia Subsystem (IMS) having a well-known Access Point Name (APN), which session is intercepted in an IMS domain by an Interception Access Point (IMS/IAP), and in an Evolved Packet System (EPS) domain by an Interception Access Point (EPS/IAP), by which interception result in the generation of copies of the session's SIP and RTP flows comprising flow identity information defined by a set of identifiers (triplet) comprising Lawful Interception Identity (LI-ID) and one of assigned IP user addresses IP_SIP or IP_RTP of the target, and identical content, the copies of SIP and RTP flows being received by a mediation function of a Lawful Interception (LI) system, the computer program product comprising software instructions which, when run on processing circuitry of the mediation device, causes the mediation device to:

determine a unique IMS Communication Identity Number (IMS CIN) and a corresponding correlation set of identifiers comprising Correlation Number of default Bearer (CN_def_B), Correlation Number of dedicated Bearer (CN_ded_B), and IMS Correlation Number (CN_IMS) for each intercepted communication session at Packet Data Protocol (PDP) context/Bearer set up and establishment event of the communication session via the IMS well-known APN;

store each unique IMS CIN together with its correlation set for an intercepted communication session;

correlate a SIP or RTP flow received from one domain to the same SIP or RTP flows of the same communication session received from the other domain by comparing the flow identity information of the received flow to the stored correlation sets for identifying a matching correlation set and its unique IMS CIN;

send, to a Law Enforcement Agency (LEA) requesting for LI of the target, the received SIP or RTP flow comprising the identified unique IMS CIN for a matching correlation set, enabling the LEA to match SIP and RTP flows of the same communication session regardless of whether intercepted in an IMS domain or an EPS domain.

* * * * *